(12) United States Patent
Kishimoto et al.

(10) Patent No.: US 11,543,926 B2
(45) Date of Patent: Jan. 3, 2023

(54) ELECTRONIC APPARATUS INCLUDING DIGITIZER AND ADHESIVE LAYER

(71) Applicant: Samsung Display Co., Ltd., Yongin-Si (KR)

(72) Inventors: Hirotsugu Kishimoto, Hwaseong-si (KR); Dasom Gu, Asan-si (KR); Yongchan Jeon, Cheonan-si (KR); Hyun-Been Hwang, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/360,166

(22) Filed: Jun. 28, 2021

(65) Prior Publication Data

US 2022/0091689 A1 Mar. 24, 2022

(30) Foreign Application Priority Data

Sep. 22, 2020 (KR) .......................... 10-2020-0122176

(51) Int. Cl.
*G06F 3/046* (2006.01)
*H04M 1/02* (2006.01)
*G06F 1/16* (2006.01)

(52) U.S. Cl.
CPC .............. *G06F 3/046* (2013.01); *G06F 1/162* (2013.01); *G06F 2203/04102* (2013.01); *H04M 1/0222* (2013.01)

(58) Field of Classification Search
CPC ........ G06F 3/046; G06F 3/041; G06F 1/1615; G06F 1/1616; G06F 1/1618; G06F 1/162; G06F 1/1641; G06F 2203/04102; H04M 1/0206; H04M 1/0214; H04M 1/0216; H04M 1/0222
See application file for complete search history.

(56) References Cited

U.S. PATENT DOCUMENTS

| 9,791,964 | B2 * | 10/2017 | Kang | ..................... G06F 3/0445 |
| 2014/0267950 | A1 * | 9/2014 | Kang | ..................... G06F 3/0446 349/12 |
| 2015/0324046 | A1 * | 11/2015 | Lo | ......................... G06F 3/0412 345/173 |
| 2017/0061836 | A1 * | 3/2017 | Kim | ........................ G06F 1/1626 |
| 2017/0278899 | A1 * | 9/2017 | Yang | ..................... G06F 3/0412 |
| 2019/0334114 | A1 | 10/2019 | Park | |

FOREIGN PATENT DOCUMENTS

| KR | 1020190124844 A | 11/2019 |
| KR | 1020210142039 A | 11/2021 |

* cited by examiner

*Primary Examiner* — Lisa S Landis
(74) *Attorney, Agent, or Firm* — Cantor Colburn LLP

(57) ABSTRACT

An electronic apparatus includes a display module in which a folding area is defined, a plate disposed below the display module to support the display module, a digitizer disposed between the plate and the display module, a first adhesive layer disposed between the display module and the digitizer, and a second adhesive layer disposed between the digitizer and the plate. At least one of the first adhesive layer and the second adhesive layer includes first and second sub-adhesive layers spaced apart with respect to the folding area.

20 Claims, 21 Drawing Sheets

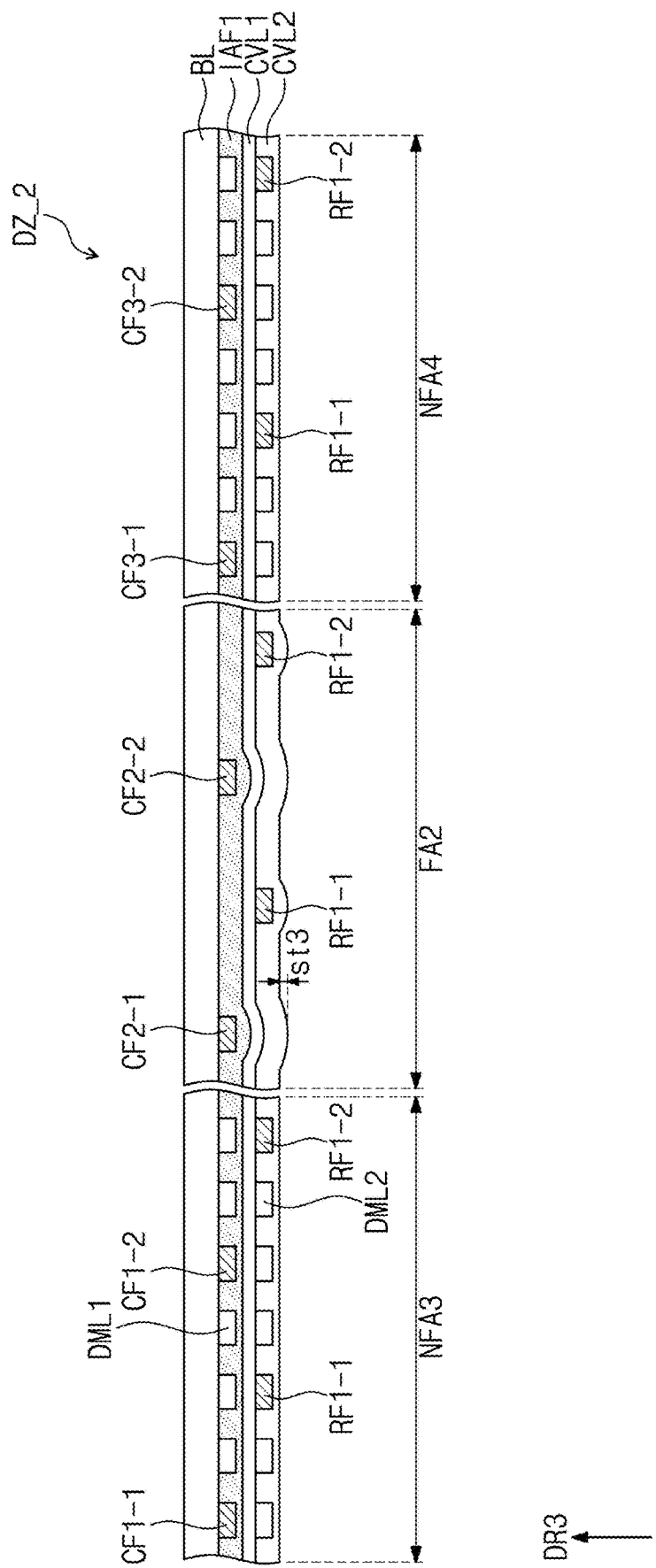

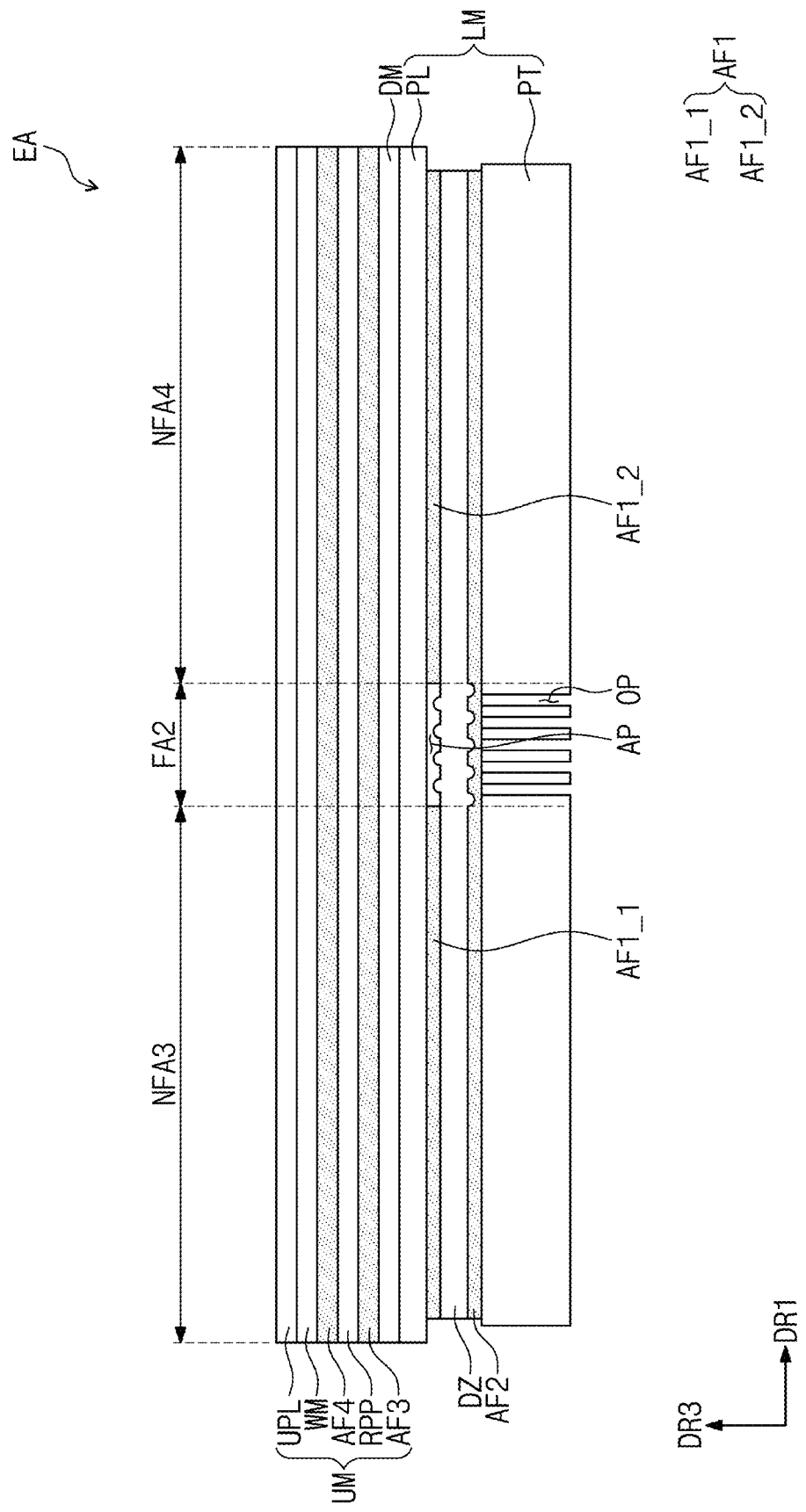

ELECTRONIC APPARATUS INCLUDING DIGITIZER AND ADHESIVE LAYER

This application claims priority to Korean Patent Application No. 10-2020-0122176, filed on Sep. 22, 2020, and all the benefits accruing therefrom under 35 U.S.C. § 119, the content of which in its entirety is herein incorporated by reference.

BACKGROUND

The present disclosure herein relates to an electronic apparatus, and more particularly, to a foldable electronic apparatus.

An electronic apparatus displays various images on a display screen to provide information to users. Typically, the electronic apparatus displays information within an allotted screen. A flexible electronic apparatus including a flexible display panel that is foldable is being developed. The flexible electronic apparatus, unlike a rigid electronic apparatus, is foldable, rollable, or bendable. The flexible electronic apparatus that is variously modifiable in shape is portable without being limited to existing screen sizes, thereby enhancing user friendliness.

SUMMARY

The present disclosure provides an electronic apparatus having improved folding reliability.

An embodiment of the inventive concept provides an electronic apparatus including a display module in which a folding area is defined, a plate disposed below the display module to support the display module, a digitizer disposed between the plate and the display module, a first adhesive layer disposed between the display module and the digitizer, and a second adhesive layer disposed between the digitizer and the plate. At least one of the first adhesive layer and the second adhesive layer includes first and second sub-adhesive layers spaced apart with respect to the folding area.

In an embodiment of the inventive concept, an electronic apparatus includes a display module, a window, a plate, a digitizer, and first and second adhesive layers. The display module has a first non-folding area, a second non-folding area, and a folding area defined therein, and has a flat first state where the display module is flat and a second state where the display module is folded such that the first and second non-folding areas face each other. The window is disposed on the display module, and the plate is disposed below the display module. The plate includes a bending portion provided with a plurality of opening patterns overlapping the folding area in a plan view. The digitizer is disposed between the plate and the display module, the first adhesive layer is disposed between the display module and the digitizer, and the second adhesive layer is disposed between the digitizer and the plate. At least one of the first adhesive layer and the second adhesive layer includes first and second sub-adhesive layers spaced apart with respect to the folding area.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 7A to 7C are enlarged cross-sectional views of a digitizer according to other embodiments of the inventive concept;

FIGS. 10A and 10B are cross-sectional views of an electronic apparatus according to an embodiment of the inventive concept.

DETAILED DESCRIPTION

Figure 1A:
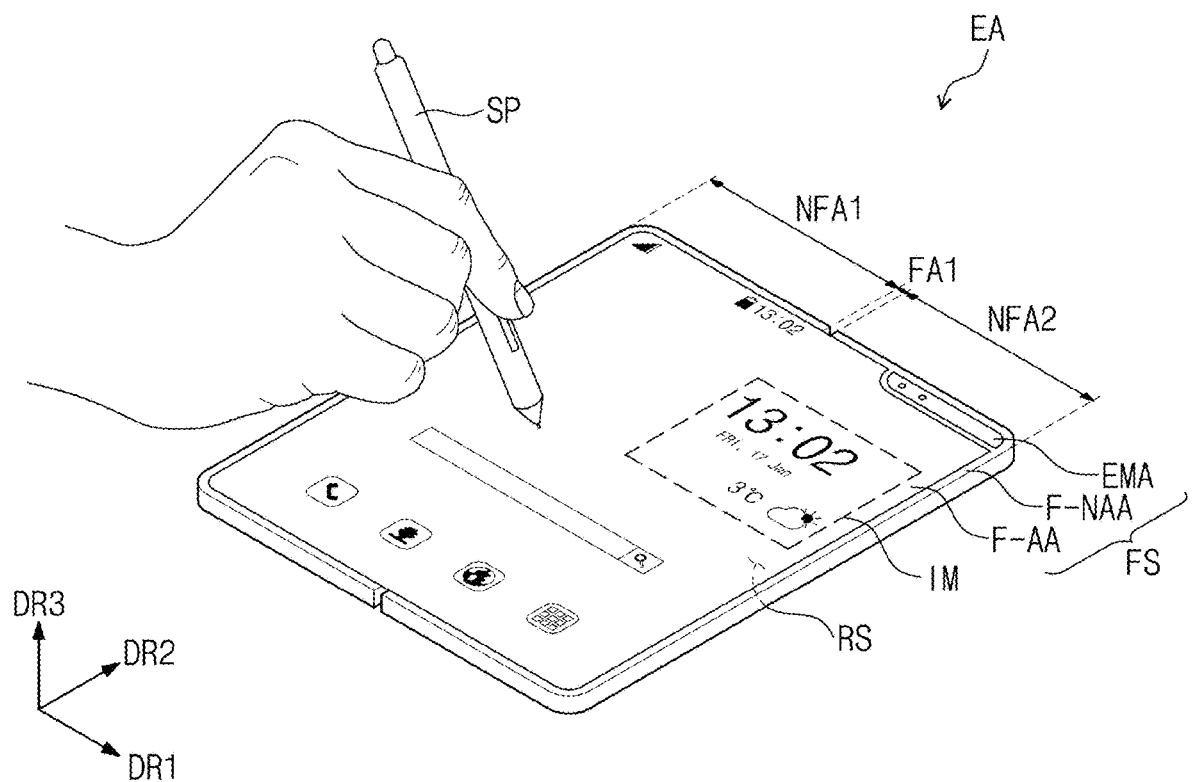
FIG. 1A is a perspective view illustrating an electronic apparatus in an unfolded state according to an embodiment of the inventive concept.

In the present description, when an element (or a region, a layer, a portion, etc.) is referred to as being "on," "connected to," or "coupled to" another element, it means that the element may be directly disposed on/connected to/coupled to the other element, or that a third element may be disposed therebetween.

Like reference numerals refer to like elements. Also, in the drawings, the thickness, the ratio, and the dimensions of elements are exaggerated for an effective description of technical contents. The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." The term "and/or," includes all combinations of one or more of which associated configurations may define.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concept. The terms of a singular form may include plural forms unless the context clearly indicates otherwise.

In addition, terms such as "below," "lower," "above," "upper," and the like are used to describe the relationship of the configurations shown in the drawings. The terms are used as a relative concept and are described with reference to the direction indicated in the drawings.

It should be understood that the terms "comprise", or "have" are intended to specify the presence of stated features, integers, steps, operations, elements, components, or combinations thereof in the disclosure, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value. Hereinafter, embodiments of the inventive concept will be described with reference to the accompanying drawings.

Figure 1B:
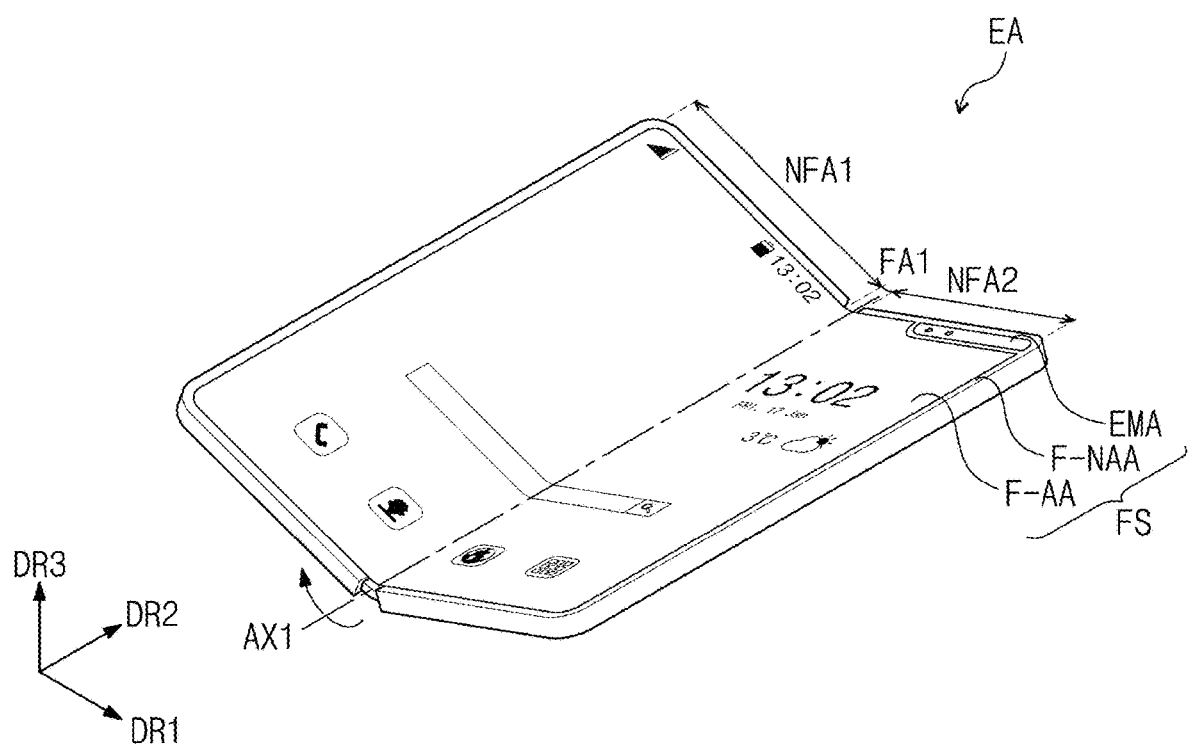
FIG. 1B is a perspective view illustrating an in-folding process of the electronic apparatus shown in FIG. 1A.
Figure 1C:
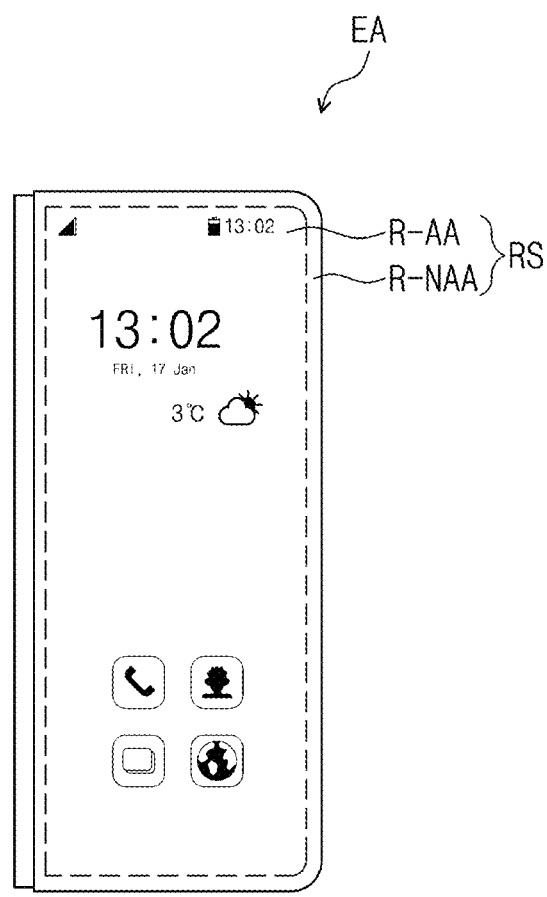
FIG. 1C is a plan view illustrating the electronic apparatus shown in FIG. 1A in an in-folded state.
Figure 1D:
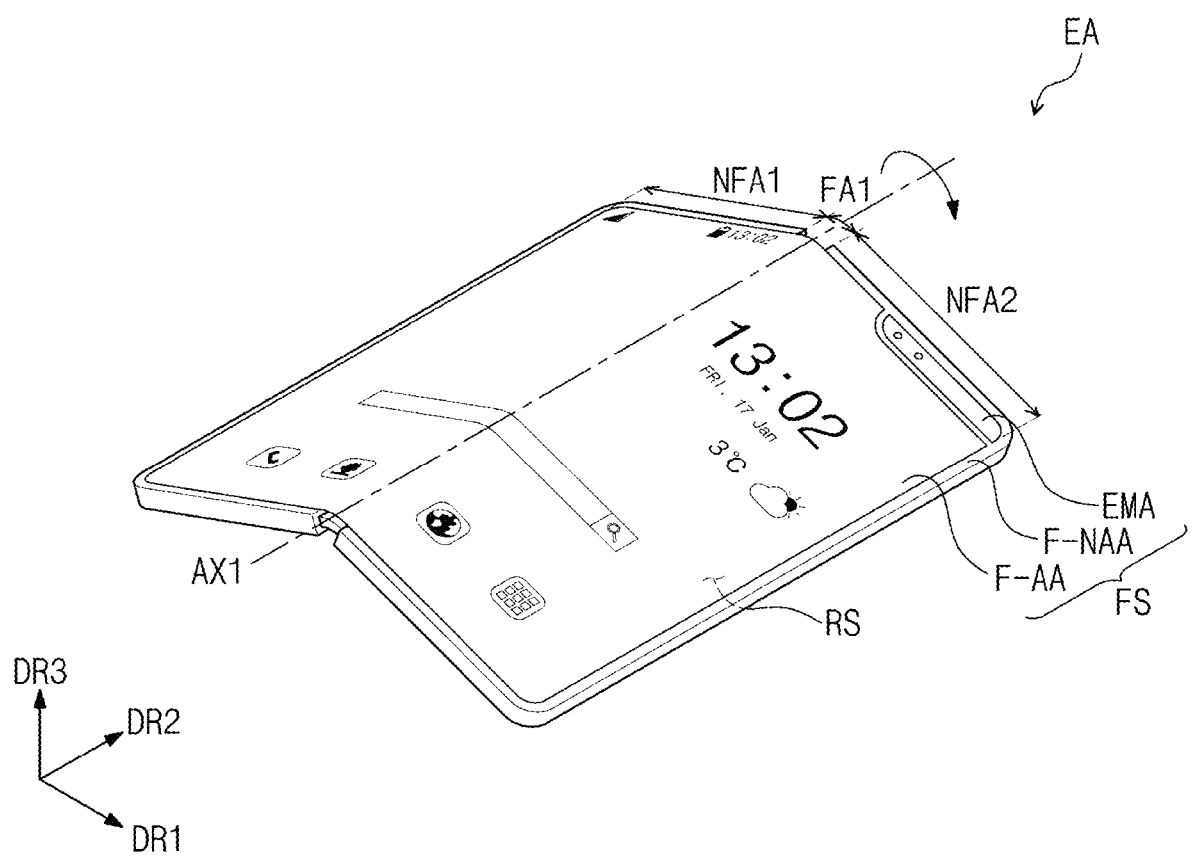
FIG. 1D is a perspective view illustrating an out-folding process of an electronic apparatus according to an embodiment of the inventive concept.

FIG. 1A is a perspective view illustrating an electronic apparatus in an unfolded state according to an embodiment of the inventive concept. FIG. 1B is a perspective view illustrating an in-folding process of the electronic apparatus shown in FIG. 1A. FIG. 1C is a plan view illustrating the electronic apparatus shown in FIG. 1A in an in-folded state. FIG. 1D is a perspective view illustrating an out-folding process of an electronic apparatus according to an embodiment of the inventive concept. As used herein, the plan view is a view shown in the third direction DR3.

Referring to FIG. 1A, an electronic apparatus EA may be a device activated according to electrical signals. The electronic apparatus EA may include various embodiments. For example, the electronic apparatus EA may include a tablet, a laptop, a computer, a smart television, etc. Hereinafter, a smartphone is illustrated as an example of the electronic apparatus EA.

The electronic apparatus EA may display an image IM towards a third direction DR3 on a first display surface FS parallel to a first direction DR1 and a second direction DR2, respectively. The first display surface FS displaying the image IM may correspond to a front surface of the electronic apparatus EA. The image IM may include a still image as well as a dynamic image. FIG. 1A illustrates an Internet search window and a watch window as an example of the image IM.

In an embodiment, a front surface (i.e., an upper surface) and a rear surface (i.e., a lower surface) of respective members are defined with respect to a direction in which the image IM is displayed. The front and rear surfaces may oppose each other in a third direction DR3, and the normal direction of each of the front and rear surfaces may be parallel to the third direction DR3.

A distance between the front and rear surfaces in the third direction DR3 may correspond to the thickness/height in the third direction DR3 (i.e., thickness direction) of the electronic apparatus EA. Directions indicated by the first to third directions DR1, DR2, and DR3 are relative concepts, and may thus be changed to other directions.

The electronic apparatus EA may detect external inputs applied from the outside. The external inputs may include various forms of inputs provided from outside the electronic apparatus EA.

In an embodiment, for example, the external inputs may include external inputs applied when approaching the electronic apparatus EA or being adjacent by a predetermined distance (e.g., hovering), as well as contact by a part of a body such as a user's hand. In addition, the external inputs may have various forms such as force, pressure, temperature, light, etc.

FIG. 1A illustrates an external input through a user's pen SP as an example. Although not shown, the pen SP may be mounted or detached inside or outside the electronic apparatus EA, and the electronic apparatus EA may provide signals corresponding to the mounting and detachment of the pen SP to the pen SP or receive the signals from the pen SP.

The electronic apparatus EA according to an embodiment may include a first display surface FS and a second display surface RS. The first display surface FS may include a first active area F-AA, a first peripheral area F-NAA, and an electronic module area EMA. The second display surface RS may be defined as a surface facing at least a portion of the first display surface FS. That is, the second display surface RS may be defined as a portion of the rear surface of the electronic apparatus EA.

The first active area F-AA may be an area activated according to electrical signals. The first active area F-AA is an area displaying the image IM and detecting various forms of the external inputs. The first peripheral area F-NAA is adjacent to the first active area F-AA. The first peripheral area F-NAA may have a predetermined color. The first peripheral area F-NAA may surround the first active area F-AA. The shape of the first active area F-AA may be substantially defined by the first peripheral area F-NAA. However, this is illustrated as an example, and the first peripheral area F-NAA may be disposed adjacent to only one side of the first active area F-AA, or may be omitted. The electronic apparatus EA according to an embodiment of the inventive concept may include various embodiments, and the invention is not limited to any one embodiment.

Various electronic modules may be disposed in the electronic module area EMA. For example, the electronic modules may include at least any one among a camera, a speaker, a light detection sensor, and a heat detection sensor. The electronic module area EMA may detect an external subject received through the first and second display surfaces FS and RS, or provide sound signals such as voice to the outside through the first and second display surfaces FS and RS. The electronic modules may include a plurality of components, and the invention is not limited to any one embodiment.

The electronic module area EMA may be surrounded by the first active area F-AA and the first peripheral area F-NAA. However, the embodiment of the inventive concept is not limited thereto, and the electronic module area EMA may be disposed in the first active area F-AA in another embodiment, and the invention is not limited to any one embodiment.

The electronic apparatus EA according to an embodiment may include at least one folding area FA1 and a plurality of non-folding areas NFA1 and NFA2 extending from the folding area FA1. The non-folding areas NFA1 and NFA2 may be disposed to be spaced apart from each other with the folding area FA1 therebetween.

Referring to FIG. 1B, the electronic apparatus EA according to an embodiment includes a virtual folding axis AX1 extending in the second direction DR2. The folding axis AX1 may extend along the second direction DR2 on the first display surface FS. That is, the folding axis AX1 may extend along a major axis direction (e.g., the second direction DR2) of the electronic apparatus EA.

In an embodiment, the non-folding areas NFA1 and NFA2 may include first and second non-folding areas NFA1 and NFA2 disposed adjacent to the folding area FA1 with the folding area FA1 therebetween. The first non-folding area NFA1 may be disposed at one side of the folding area FA1 along the first direction DR1, and the second non-folding area NFA2 may be disposed at the other side of the folding area FA1 along the first direction DR1.

The electronic apparatus EA may be folded with respect to the folding axis AX1 to become an in-folded state such that one area overlapping the first non-folding area NFA1 on the first display surface FS and the other area overlapping the second non-folding area NFA2 on the first display surface FS face each other in a plan view.

Referring to FIG. 1C, in the electronic apparatus EA according to an embodiment, the second display surface RS may be viewed in the in-folded state by users. In this case, the second display surface RS may include a second active area R-AA displaying an image and a second peripheral area R-NAA adjacent to the second active area R-AA. The second active area R-AA may be an area activated according to electrical signals. The second active area R-AA is an area displaying an image and detecting various forms of external inputs. The second peripheral area R-NAA may have a predetermined color. The second peripheral area R-NAA may surround the second active area R-AA. In addition, although not shown, the second display surface RS may further include an electronic module area in which an electronic module including various components is disposed, and the invention is not limited to any one embodiment.

Referring to FIG. 1D, the electronic apparatus EA according to an embodiment may be folded with respect to the folding axis AX1 to become an out-folded state such that one area overlapping the first non-folding area NFA1 on the second display surface RS and the other area overlapping the second non-folding area NFA2 on the second display surface RS face each other in a plan view.

However, the embodiment of the inventive concept is not limited thereto, and the electronic apparatus EA may be folded with respect to a plurality of folding axes such that portions of each of the first display surface FS and the second display surface RS may face each other, and the number of folding axes and the number of corresponding non-folding areas are not particularly limited.

Figure 2A:
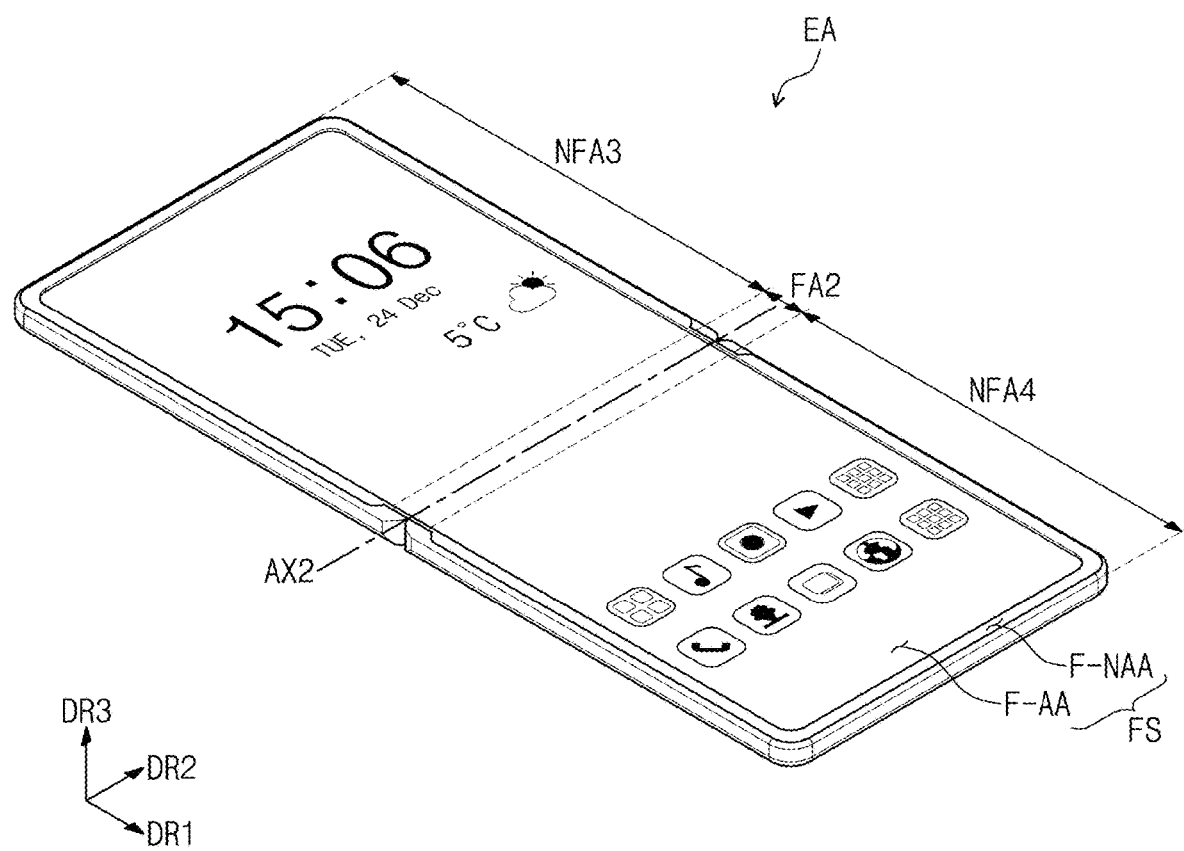
FIG. 2A is a perspective view illustrating an electronic apparatus in an unfolded state according to another embodiment of the inventive concept.
Figure 2B:
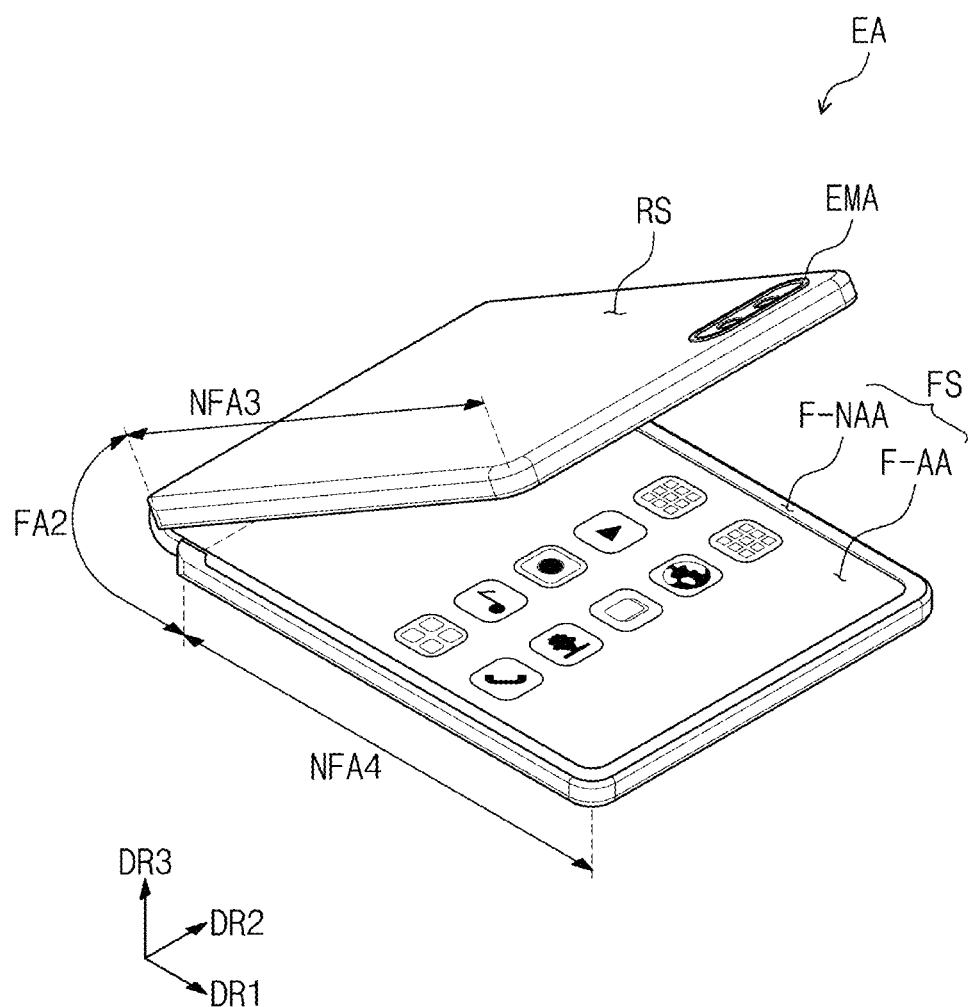
FIG. 2B is a perspective view illustrating an in-folding process of the electronic apparatus shown in FIG. 2A.

FIG. 2A is a perspective view illustrating an electronic apparatus in an unfolded state according to another embodiment of the inventive concept. FIG. 2B is a perspective view illustrating an in-folding process of the electronic apparatus shown in FIG. 2A.

Referring to FIGS. 2A and 2B, the electronic apparatus EA may be in-folded or out-folded with respect to a virtual folding axis AX2. The folding axis AX2 may extend along the second direction DR2. In FIGS. 1A to 1D, the folding axis AX1 may extend along the major axis (i.e., longitudinal axis) direction of the electronic apparatus EA, whereas in FIGS. 2A and 2B, the folding axis AX2 may extend along a minor axis (i.e., latitudinal axis) direction of the electronic apparatus EA.

In the electronic apparatus EA, a plurality of areas may be defined according to operation types. The plurality of areas may be divided into a folding area FA2 and at least one non-folding area, NFA3 or NFA4. The folding area FA2 is defined between two non-folding areas NFA3 and NFA4.

The folding area FA2 is an area that is folded with respect to the folding axis AX2 and substantially forms a curvature. As an example of the inventive concept, the non-folding areas NFA3 and NFA4 may include a first non-folding area NFA3 and a second non-folding area NFA4. The first non-folding area NFA3 is adjacent to one side of the folding area FA2 in the first direction DR1, and the second non-folding area NFA4 is adjacent to the other side of the folding area FA2 in the first direction DR1.

In an embodiment, one folding area FA2 is defined in the electronic apparatus EA, but the embodiment of the inventive concept is not limited thereto. According to another embodiment of the inventive concept, a plurality of folding areas may be defined in the electronic apparatus EA.

When the electronic apparatus EA is in an unfolded state, the first display surface FS may be viewed by users and when being in an in-folded state, the second display surface RS may be viewed by users. The second display surface RS may include an electronic module area EMA in which electronic modules including various components are disposed.

Figure 3A:
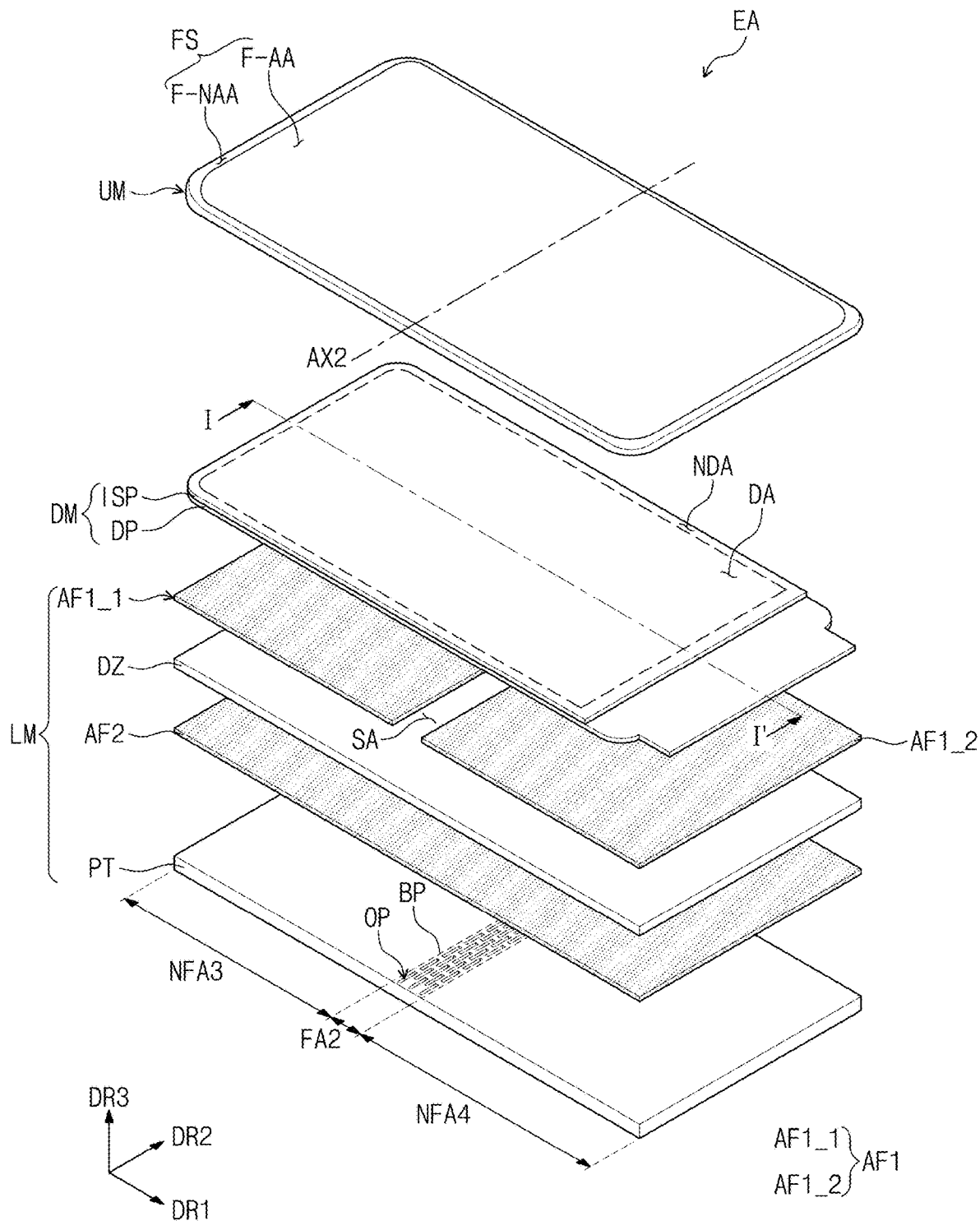
FIG. 3A is an exploded perspective view of an electronic apparatus according to an embodiment of the inventive concept.
Figure 3B:
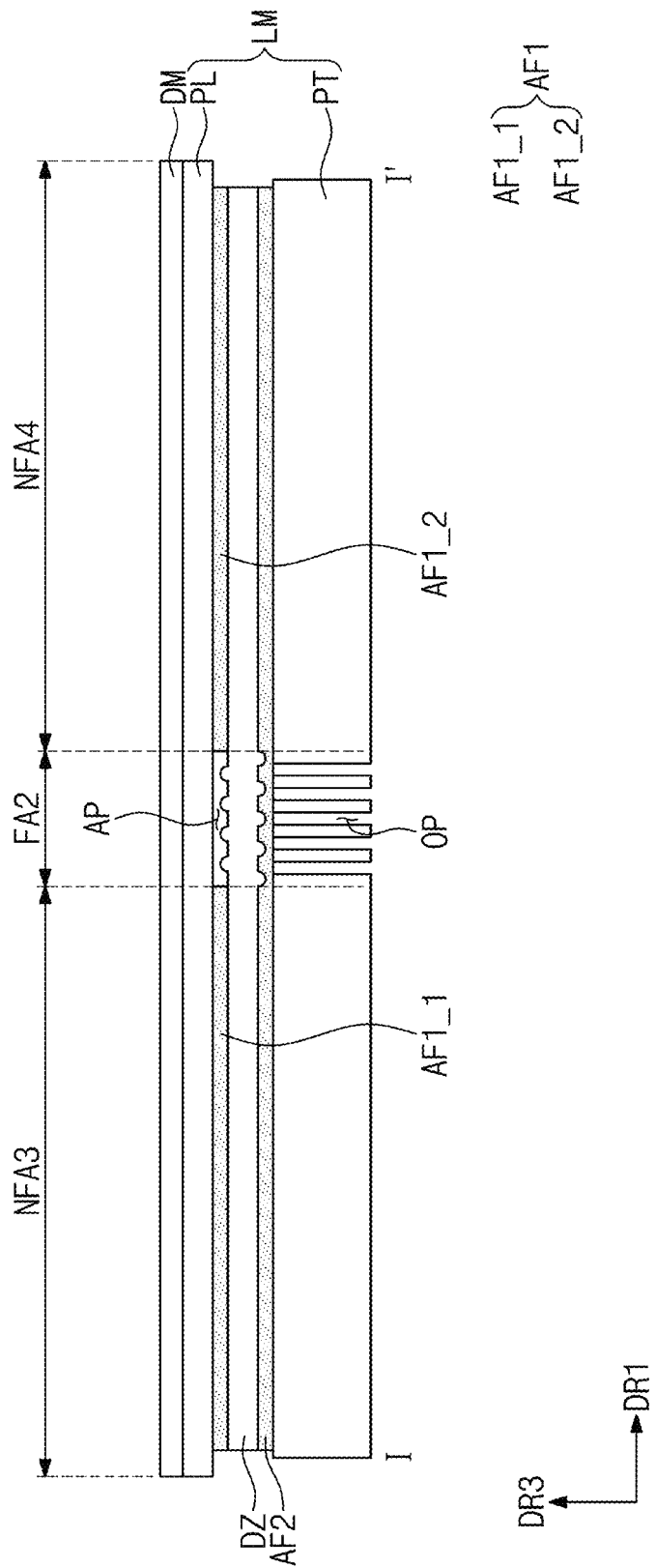
FIG. 3B is a cross-sectional view taken along line I-I' shown in FIG. 3A.
Figure 4:
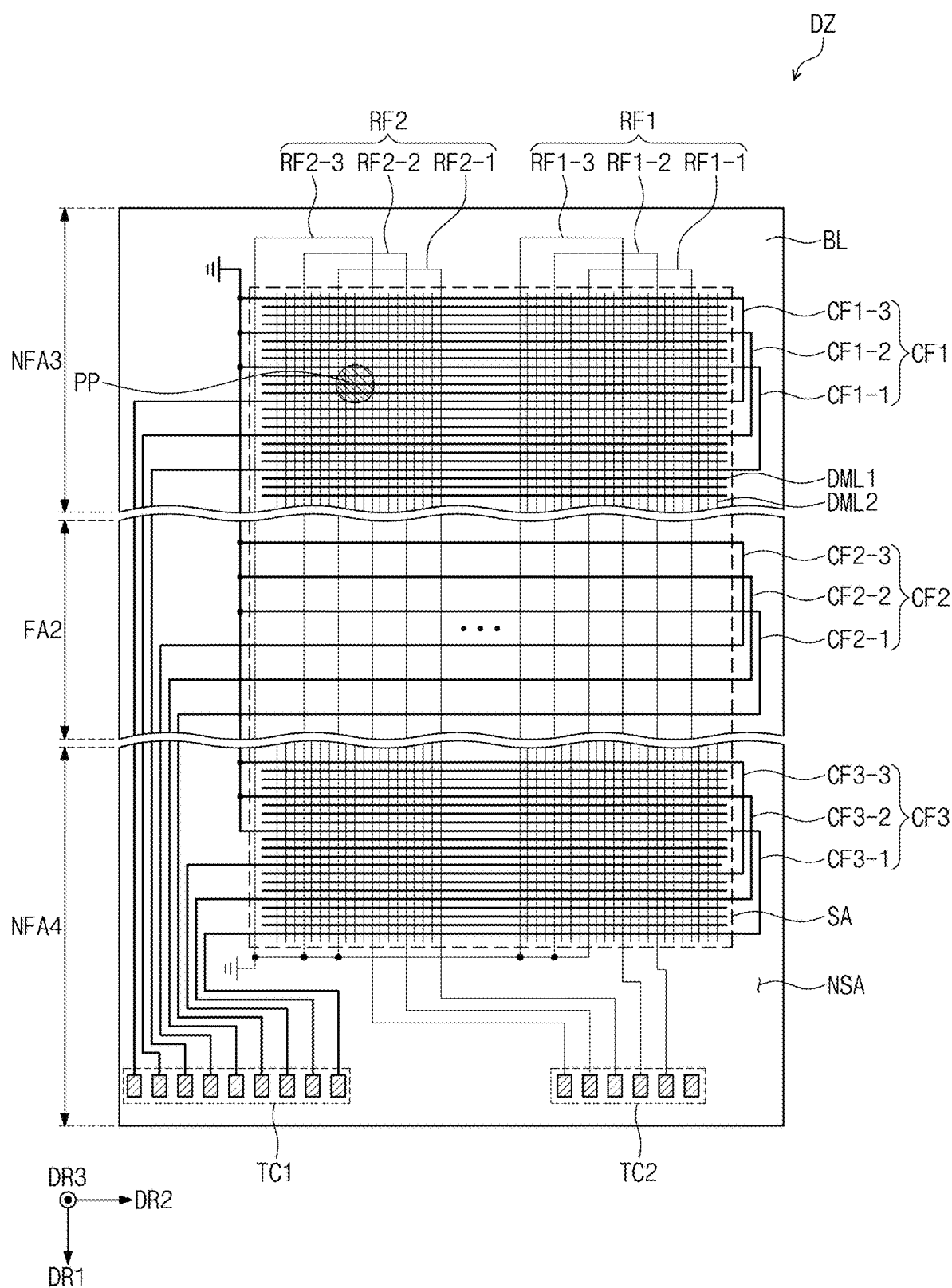
FIG. 4 is a plan view of a digitizer shown in FIG. 3A.
Figure 5:
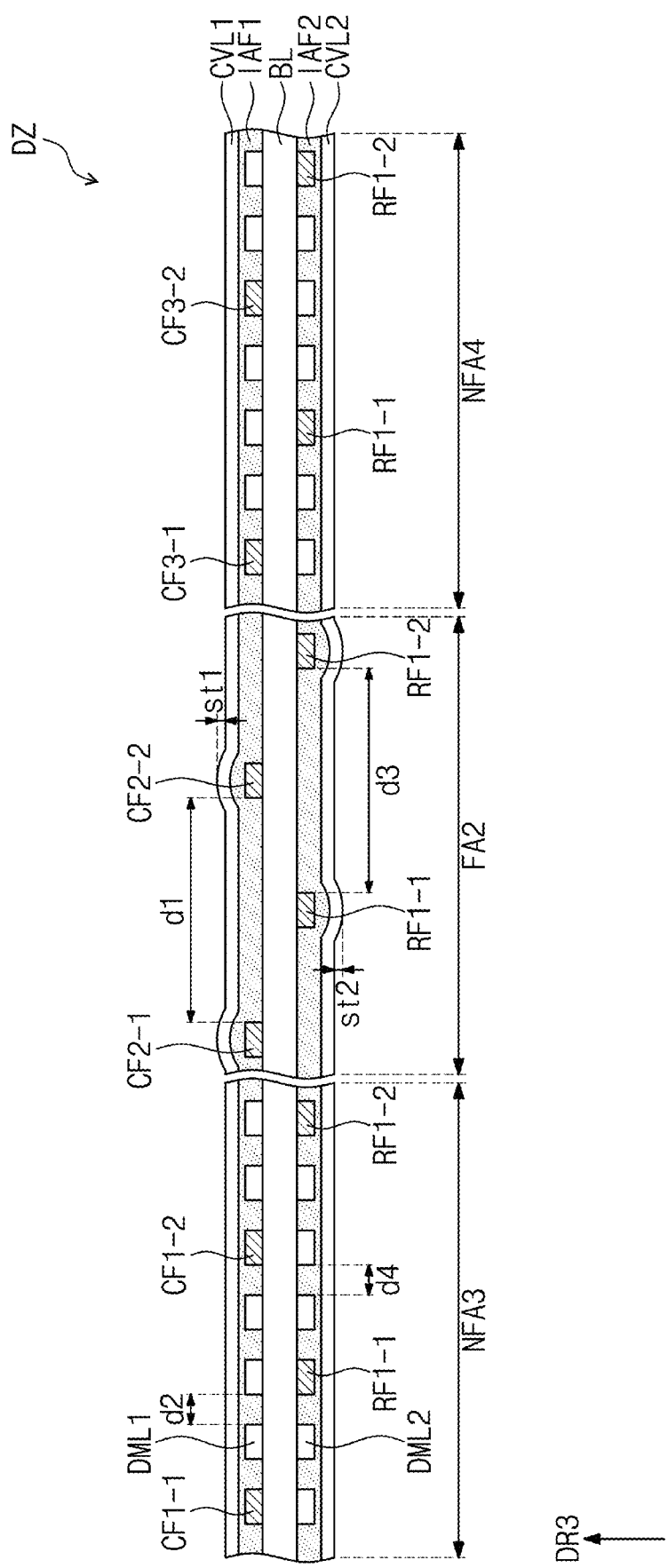
FIG. 5 is an enlarged cross-sectional view of a digitizer shown in FIG. 3B.

FIG. 3A is an exploded perspective view of an electronic apparatus according to an embodiment of the inventive concept, and FIG. 3B is a cross-sectional view taken along line I-I" shown in FIG. 3A. FIG. 4 is a plan view of a digitizer shown in FIG. 3A. FIG. 5 is an enlarged cross-sectional view of a digitizer shown in FIG. 3B. FIG. 5 is a cross-sectional view of a digitizer taken along a diagonal line of which direction is between the first direction DR1 and the second direction DR2.

Referring to FIG. 3A, the electronic apparatus EA according to an embodiment of the inventive concept may include a display module DM displaying images, an upper module UM disposed on the display module DM, and a lower module LM disposed below the display module DM. The display module DM is a portion of the electronic apparatus EA, and in particular, may generate images.

The display module DM may include a display panel DP and an input sensing unit ISP. The display panel DP according to an embodiment of the inventive concept may be a light emitting display panel, and the invention is not limited thereto. For example, the display panel DP may be an organic light emitting display panel or a quantum dot light emitting display panel. An emission layer of the organic light emitting display panel may include organic light emitting materials. An emission layer of the quantum dot light emitting display panel may include quantum dots, quantum rods, etc.

The display panel DP may be a flexible display panel. Accordingly, the display panel DP may be entirely rollable, or folded or unfolded with respect to the folding axis AX2.

The input sensing unit ISP may be directly disposed on the display panel DP. According to an embodiment of the inventive concept, the input sensing unit ISP may be formed on the display panel DP through a continuous manufacturing process. That is, when the input sensing unit ISP is directly disposed on the display panel DP, an adhesive film is not disposed between the input sensing unit ISP and the display panel DP. However, the embodiment of the inventive concept is not limited thereto. The adhesive film may be disposed between the input sensing unit ISP and the display panel DP in another embodiment. In this case, the input sensing unit ISP is not manufactured simultaneously with the display panel DP through a continuous manufacturing process, and after being manufactured through a separate process from the display panel DP, the input sensing unit ISP may be fixed on an upper surface of the display panel DP through the adhesive film. The input sensing unit ISP may obtain coordinate information of users' inputs (e.g., touch events).

The upper module UM may include a window disposed on the display module DM. The window may include an optically transparent insulating material. Accordingly, images generated in the display module DM may be readily recognized by users through the window.

The upper module UM may further include a protective layer disposed on the window. The protective layer may be a layer for improving impact resistance of the window and preventing scattering when damaged. The protective layer may include at least one selected from a urethane-based resin, an epoxy-based resin, a polyester-based resin, a polyether-based resin, an acrylate-based resin, an acrylonitrile-butadiene-styrene resin ("ABS"), and a rubber. As an example of the inventive concept, the protective layer may include at least one among phenylene, polyethylene terephthalate ("PET"), polyimide ("PI"), polyamide ("PAI"), polyethylene naphthalate ("PEN"), and polycarbonate ("PC").

In addition, the upper module UM may further include at least one functional layer disposed between the display module DM and the window. As an example of the inventive concept, the functional layer may be an anti-reflection layer that blocks external light reflection.

The display module DM may display images according to electrical signals and transmit/receive information of external inputs. The display module DM may include a display area DA and a non-display area NDA. The display area DA may be defined as an area outputting images provided from the display module DM.

The non-display area NDA is adjacent to the display area DA. For example, the non-display area NDA may surround the display area DA. However, this is illustrated as an example, and the non-display area NDA may be defined in various shapes, and the invention is not limited to any one embodiment. According to an embodiment, the display area DA of the display module DM may correspond to at least a portion of the first active area F-AA.

The lower module LM includes a plate PT disposed on a rear surface of the display module DM to support the display module DM. The plate PT may have a plate shape. As an example of the inventive concept, the plate PT may be formed in a single plate shape having a size corresponding to the display module DM. In addition, the plate PT may include metallic materials. That is, the plate PT may be a metal plate. As an example of the inventive concept, the plate PT may include stainless steel, aluminum, or an alloy thereof. The strength of the plate PT may be greater than the strength of the display module DM.

The plate PT may include a bending portion BP provided with a plurality of patterns OP. The bending portion BP may correspond to the folding area FA2. The plurality of patterns OP may be arranged at a predetermined distance from each other in the bending portion BP. The plurality of patterns OP may be arranged in the form of a zigzag in the direction (e.g., the first direction DR1) perpendicular to the folding axis AX2. In addition, the plurality of patterns OP each may be an opening pattern defined in and passing through the plate PT. However, the embodiment of the inventive concept is not limited thereto. That is, the plurality of patterns OP each may be a groove pattern recessed from one surface (an upper surface or lower surface) of the plate PT. The plurality of patterns OP each may have a rectangular shape extending in the second direction DR2 (i.e., direction of the folding axis AX2) along the folding area FA2. However, the shape of the plurality of patterns OP according to the invention is not limited thereto. For example, the plurality of patterns OP each may have a rhombus shape or a circular shape in another embodiment.

Flexibility of the bending portion BP may be increased by providing the plurality of patterns OP to the bending portion BP. The plate PT may facilitate the folding operation of the electronic apparatus EA while supporting the display module DM.

The bending portion BP of the plate PT may include a plurality of support bars. Each of the plurality of support bars has a bar shape extending in the second direction DR2 parallel to the folding axis AX2. The bending portion BP may define the plurality of patterns OP provided between the plurality of support bars. The plurality of patterns OP each may be a slit pattern. The plurality of support bars may be spaced apart from each other through a plurality of slit patterns. The plurality of support bars each may have a cross-sectional structure of a square shape in the first direction DR1. However, the cross-sectional shape of the plurality of support bars according to the invention is not limited thereto. For example, the plurality of support bars each may have a trapezoidal shape or a triangular shape in another embodiment.

The lower module LM further includes a digitizer DZ disposed between the plate PT and the display module DM.

Referring to FIG. 4, the digitizer DZ may detect external inputs through an electromagnetic resonance ("EMR") method. The electromagnetic resonance (EMR) method generates a magnetic field in a resonance circuit configured inside the pen SP (refer to FIG. 1A), and the vibrating magnetic field induces signals to a plurality of coils included in the digitizer DZ and detects the positions of the external inputs provided by the pen SP through the signals induced to the coils.

A sensing area SA and a non-sensing area NSA may be defined in the digitizer DZ. The non-sensing area NSA may surround the sensing area SA. The sensing area SA may be an area detecting the external inputs of the pen SP applied from the outside. The sensing area SA may overlap the display area DA of the display panel DP in a plan view.

The digitizer DZ may include a base layer BL, first sensors CF1, CF2, and CF3, and second sensors RF1 and RF2.

The base layer BL may be a base layer in which the first and second sensors CF1, CF2, CF3, RF1, and RF2 are disposed. The base layer BL may include organic materials. For example, the base layer BL may include polyimide (PI).

The first sensors CF1, CF2, and CF3 each include a plurality of first sensing lines. For example, the first sensor CF1 may include first sensing lines CF1-1, CF1-2, and CF1-3, the first sensor CF2 may include first sensing lines CF2-1, CF2-2, and CF2-3, and the first sensor CF3 may include first sensing lines CF3-1, CF3-2, and CF3-3. The second sensors RF1 and RF2 each include a plurality of second sensing lines. For example, the second sensors RF1 may include second sensing lines RF1-1, RF1-2, and RF1-3, and the second sensors RF2 may include second sensing lines RF2-1, RF2-2, and RF2-3. The plurality of first sensing lines CF1-1 to CF3-3 and the plurality of second sensing lines RF1-1 to RF2-3 each may include metals. In an embodiment, the plurality of first sensing lines CF1-1 to CF3-3 and the plurality of second sensing lines RF1-1 to RF2-3 each may include copper (Cu).

The first sensing lines CF1-1 to CF3-3 may extend in the second direction DR2. The first sensing lines CF1-1 to CF3-3 may be arranged to be spaced apart from one another along the first direction DR1. The second sensing lines RF1-1 to RF2-3 may extend in the first direction DR1. The second sensing lines RF1-1 to RF2-3 may be arranged to be spaced apart from each other along the second direction DR2. The first sensing lines CF1-1 to CF3-3 and the second sensing lines RF1-1 to RF2-3 may be disposed to be insulated from one another.

The first sensors CF1, CF2, and CF3 correspond to input coils of an electromagnetic resonance type digitizer DZ, and the second sensors RF1 and RF2 correspond to output coils of the electromagnetic resonance type digitizer DZ.

The digitizer DZ may further include first pads TC1 and second pads TC2. The first pads TC1 are connected to the first sensing lines CF1-1 to CF3-3, respectively, and the second pads TC2 are connected to the second sensing lines RF1-1 to RF2-3, respectively. The first pads TC1 are connected to first ends of the first sensing lines CF1-1 to CF3-3, respectively, and second ends (i.e., end opposite the first end) of the first sensing lines CF1-1 to CF3-3 may be grounded. The second pads TC2 are connected to first ends of the second sensing lines RF1-1 to RF2-3, respectively, and second ends (i.e., end opposite the first end) of the second sensing lines RF1-1 to RF2-3 may be grounded.

The first sensing lines CF1-1 to CF3-3 each receive scan signals activated in different time periods. The first sensing lines CF1-1 to CF3-3 each generate a magnetic field in response to a corresponding scan signal of the scan signals.

The pen SP may include an LC resonance circuit including an inductor and a capacitor. When the pen SP (see FIG. 1A) is adjacent to the first sensing lines CF1-1 to CF3-3, the magnetic field induced from the first sensing lines CF1-1 to CF3-3 resonates with the LC resonance circuit of the pen SP. The pen SP generates resonant frequencies. The second sensing lines RF1-1 to RF2-3 output sensing signals according to the resonant frequencies of the pen SP to the second pads TC2.

In FIG. 4, the center of an area where the second line CF1-2 among the first sensing lines CF1-1 to CF3-3, and the second line RF2-2 among the second sensing lines RF1-1, RF1-2, RF1-3, RF2-1, RF2-2, and RF2-3 cross is assumed as an input point PP in contact with the pen SP.

In this example, the sensing signal output from the second line CF1-2 among the first sensing lines CF1-1 to CF3-3 has a higher level than the sensing signals output from the remaining first sensing lines CF1-1, CF1-3 to CF3-3. The sensing signal output from the second line RF2-2 among the second sensing lines RF1-1 to RF2-3 has a higher level than the sensing signals output from the remaining second sensing lines RF1-1 to RF2-1, RF2-3.

In this example, the sensing signals output from the first line RF2-1 and the third line RF2-3 among the second sensing lines RF1-1 to RF2-3 have a lower level than the sensing signal output from the second line RF2-2, and the sensing signals output from the first line RF2-1 and the third line RF2-3 among the second sensing lines RF1-1 to RF2-3 have a higher level than the sensing signals output from the remaining second sensing lines RF1-1, RF1-2, and RF1-3.

In this example, based on the time when the sensing signal output from the second line RF2-2 having a high level is detected and the relative position of the second line RF2-2 to the second sensing lines RF1-1 to RF2-3, two-dimensional coordinate information of the input point PP through the pen SP may be calculated.

The digitizer DZ includes first dummy lines DML1 and second dummy lines DML2. The first dummy lines DML1 extend in the second direction DR2 and are arranged to be spaced apart from each other in the first direction DR1. The first dummy lines DML1 are disposed among the first sensing lines CF1-1 to CF1-3 and disposed among CF3-1 to CF3-3, and are electrically insulated from the first sensing lines CF1-1 to CF3-3. As an example of the inventive concept, the first dummy lines DML1 may be in a floating state.

The second dummy lines DML2 extend in the first direction DR1 and are arranged to be spaced apart from each other in the second direction DR2. The second dummy lines DML2 are disposed among the second sensing lines and RF1-1 to RF1-3 and disposed among RF2-1 to 2-3, and are electrically insulated from the second sensing lines RF1-1 to RF2-3. As an example of the inventive concept, the second dummy lines DML2 may be in a floating state.

As shown in FIG. 4, the first dummy lines DML1 and the second dummy lines DML2 are disposed in the first and second non-folding areas NFA3 and NFA4, and are not disposed in the folding area FA2. Accordingly, the first dummy lines DML1 and the second dummy lines DML2 overlap the first and second non-folding areas NFA3 and NFA4, and does not overlap the folding area FA2 in a plan view. The first dummy lines DML1 and the second dummy lines DML2 may include metals. For example, the first dummy lines DML1 and the second dummy lines DML2 may include the same material as the first and second sensing lines CF1-1 to CF3-3 and RF1-1 to RF2-3.

Referring to FIGS. 4 and 5, the first sensing lines CF1-1 to CF3-3 are disposed on a first surface of the base layer BL, and the second sensing lines RF1-1 to RF2-3 are disposed on a second surface of the base layer BL. The first surface of the base layer BL may be defined as an upper surface of the base layer BL, and the second surface of the base layer BL may be defined as a lower surface of the base layer BL. The arrangements of the first sensing lines CF1-1 to CF3-3 and the second sensing lines RF1-1 to RF2-3 according to the invention are not limited thereto. That is, the first sensing lines CF1-1 to CF3-3 may be disposed on the second surface of the base layer BL, and the second sensing lines RF1-1 to RF2-3 may be disposed on the first surface of the base layer BL in another embodiment.

The digitizer DZ may further include a first cover layer CVL1 covering the first sensing lines CF1-1 to CF3-3, and a second cover layer CVL2 covering the second sensing lines RF1-1 to RF2-3. The first and second cover layers CVL1 and CVL2 each may include the same material as the base layer BL. That is, the first and second cover layers CVL1 and CVL2 each may include polyimide (PI).

The digitizer DZ further includes a first inner adhesive layer IAF1 and a second inner adhesive layer IAF2. The first inner adhesive layer IAF1 is disposed between the first cover layer CVL1 and the base layer BL, and the second inner adhesive layer IAF2 is disposed between the second cover layer CVL2 and the base layer BL. Accordingly, the first cover layer CVL1 is bonded to the first surface of the base layer BL through the first inner adhesive layer IAF1, and the second cover layer CVL2 is bonded to the second surface of the base layer BL through the second inner adhesive layer IAF2. The first and second inner adhesive layers IAF1 and IAF2 each may include an optically transparent adhesive material. The first and second inner adhesive layers IAF1 and IAF2 each may include a pressure sensitive adhesive ("PSA"), an optically clear adhesive ("OCA"), or an optically clear resin ("OCR").

The digitizer DZ may further include a magnetic sheet. The magnetic sheet may be disposed below the second inner adhesive layer IAF2 or the second cover layer CVL2. The magnetic sheet may be a layer including magnetic metal powder ("MMP").

In the first and second non-folding areas NFA3 and NFA4, the first dummy lines DML1 are disposed among the first sensing lines CF1-1 to CF3-3, and in the first and second non-folding areas NFA3 and NFA4, the second dummy lines DML2 are disposed among the second sensing lines RF1-1 to RF2-3. The first dummy lines DML1 are disposed in a separation area among the first sensing lines CF1-1 to CF3-3. The first dummy lines DML1 are formed on the first surface of the base layer BL through the same manufacturing process as the first sensing lines CF1-1 to CF3-3. The first dummy lines DML1 and the first sensing lines CF1-1 to CF3-3 are disposed on the same layer.

A distance d2 between two adjacent first dummy lines DML1 may be smaller than a distance d1 between any two of the first sensing lines CF1-1 to CF3-3 in a plan defined by the first and second direction DR1 and DR2. The first dummy lines DML1 are disposed between the first sensing lines CF1-1 to CF3-3 at a smaller interval than the interval of any two of the first sensing lines CF1-1 to CF3-3, and in the first and second non-folding areas NFA3 and NFA4, a surface step of the upper surface of the digitizer DZ due to the first sensing lines CF1-1 to CF3-3 may thus be effectively reduced or removed.

The second dummy lines DML2 are disposed in a separation area between the second sensing lines RF1-1 to RF2-3. The second dummy lines DML2 are formed on the second surface of the base layer BL through the same manufacturing process as the second sensing lines RF1-1 to RF2-3. The second dummy lines DML2 and the second sensing lines RF1-1 to RF2-3 are disposed on the same layer. A distance d4 between two adjacent second dummy lines DML2 may be smaller than a distance d3 between any two of the second sensing lines RF1-1 to RF2-3 in a plan defined by the first and second direction DR1 and DR2. The second dummy lines DML2 are disposed between the second sensing lines RF1-1 to RF2-3 at a smaller interval than the interval of any two of the second sensing lines RF1-1 to RF2-3, and in the first and second non-folding areas NFA3 and NFA4, a surface step of the lower surface of the digitizer DZ due to the second sensing lines RF1-1 to RF2-3 may thus be effectively reduced or removed.

The first and second dummy lines DML1 and DML2 are not disposed in the folding area FA2. When the first and second dummy lines DML1 and DML2 are disposed in the folding area FA2, the flexibility of the folding area FA2 may be deteriorated due to the first and second dummy lines DML1 and DML2. That is, the first and second dummy lines DML1 and DML2 do not overlap the folding area FA2 in a plan view to prevent deterioration in the folding properties of the electronic apparatus EA (see FIG. 1A).

The first and second dummy lines DML1 and DML2 are not disposed in the folding area FA2, and a surface step st1 in the thickness direction (i.e., third direction DR3) due to the first sensing lines CF1-1 to CF3-3 may thus be formed on the upper surface of the digitizer DZ in the folding area FA2, and a surface step st2 in the third direction DR3 due to the second sensing lines RF1-1 to RF2-3 may thus be formed on the lower surface of the digitizer DZ in the folding area FA2. That is, due to these surface steps st1 and st2, the surface roughness of the digitizer DZ in the folding area FA2 may be greater than the surface roughness of the digitizer DZ in the non-folding areas NFA3 and NFA4.

Referring to FIGS. 3A and 3B, the lower module LM may further include a first adhesive layer AF1 and a second adhesive layer AF2. The first adhesive layer AF1 is disposed above the digitizer DZ, and the second adhesive layer AF2 is disposed below the digitizer DZ. The first adhesive layer AF1 includes a first sub-adhesive layer AF1_1 and a second sub-adhesive layer AF1_2. The first sub-adhesive layer AF1_1 and the second sub-adhesive layer AF1_2 may be disposed to be spaced apart from each other with respect to the folding area FA2. That is, the first sub-adhesive layer AF1_1 and the second sub-adhesive layer AF1_2 are spaced apart from each other in the first direction DR1 to form a separation area SA (i.e., empty space) therebetween. The separation area SA may be provided corresponding to the folding area FA2. The first sub-adhesive layer AF1_1 may be disposed corresponding to the first non-folding area NFA3, and the second sub-adhesive layer AF1_2 may be disposed corresponding to the second non-folding area NFA4.

The first and second adhesive layers AF1 and AF2 each may include an optically transparent adhesive material. As an example of the inventive concept, the first and second adhesive layers AF1 and AF2 each may include a pressure sensitive adhesive (PSA), an optically clear adhesive (OCA), or an optically clear resin (OCR).

The lower module LM further includes a protective layer PL disposed below the display module DM. The protective layer PL may be disposed between the digitizer DZ and the display module DM. The protective layer PL may be bonded to the rear surface of the display module DM through a separate adhesive layer. The protective layer PL may prevent scratches from occurring on the rear surface of the display module DM in the manufacturing process of the display module DM. The protective layer PL may be a colored polyimide film. For example, the protective layer PL may be an opaque yellow film, but the invention is not limited thereto.

As an example of the inventive concept, the protective layer PL is disposed between the first adhesive layer AF1 and the display module DM. A first portion of the protective layer PL disposed in the first non-folding area NFA3 is bonded to the digitizer DZ through the first sub-adhesive layer AF1_1, and a second portion of the protective layer PL disposed in the second non-folding area NFA4 is bonded to the digitizer DZ through the second sub-adhesive layer AF1_2. The first and second sub-adhesive layers AF1_1 and AF1_2 are spaced apart from each other in the folding area FA2, and an air gap AP is provided between the protective layer PL and the digitizer DZ as the separation area SA between the first and second sub-adhesive layers AF1_1 and AF1_2.

The digitizer DZ and the protective layer PL may be spaced apart in the third direction DR3 due to the air gap AP in the folding area FA2. Accordingly, it is effectively reduced or prevented for the surface steps st1 and st2 (see FIG. 5) formed on the digitizer DZ from being reflected in the display module DM and the upper module UM and therefore from being viewed on the first display surface FS of the electronic apparatus EA.

The second adhesive layer AF2 is disposed between the digitizer DZ and the plate PT. Accordingly, the digitizer DZ may be bonded to an upper surface of the plate PT through the second adhesive layer AF2.

As an example of the inventive concept, the first and second adhesive layers AF1 and AF2 each may have a thickness of about 0.1 micrometers (μm) to about 25 μm in the third direction DR3. In addition, the first and second adhesive layers AF1 and AF2 each may have a modulus of about 0.01 megapascals (MPa) to about 0.2 MPa at −20 degrees in Celsius (° C.). However, the thickness and modulus of the first and second adhesive layers AF1 and AF2 according to the invention are not limited thereto.

Figure 6A:
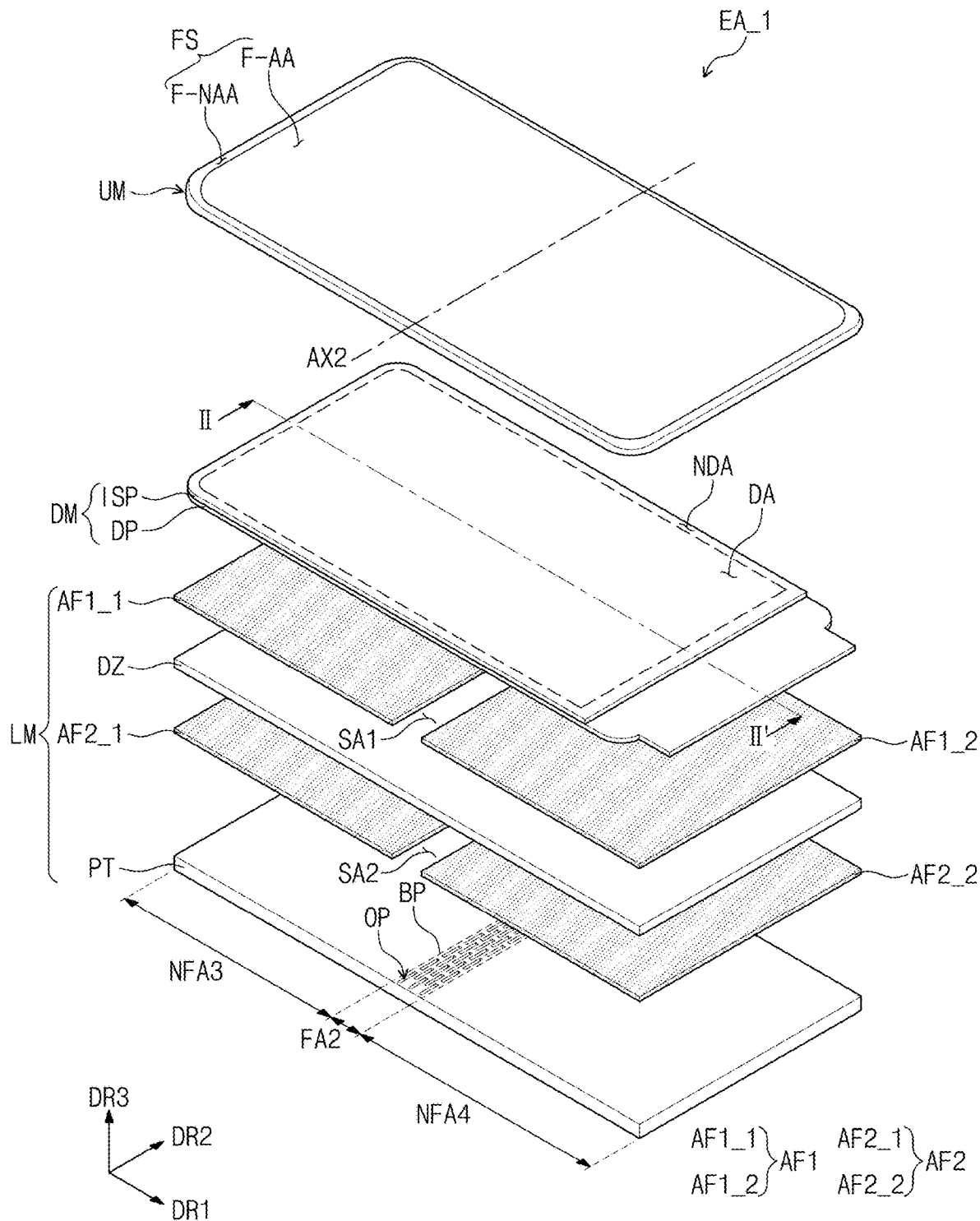
FIG. 6A is an exploded perspective view of an electronic apparatus according to another embodiment of the inventive concept.
Figure 6B:
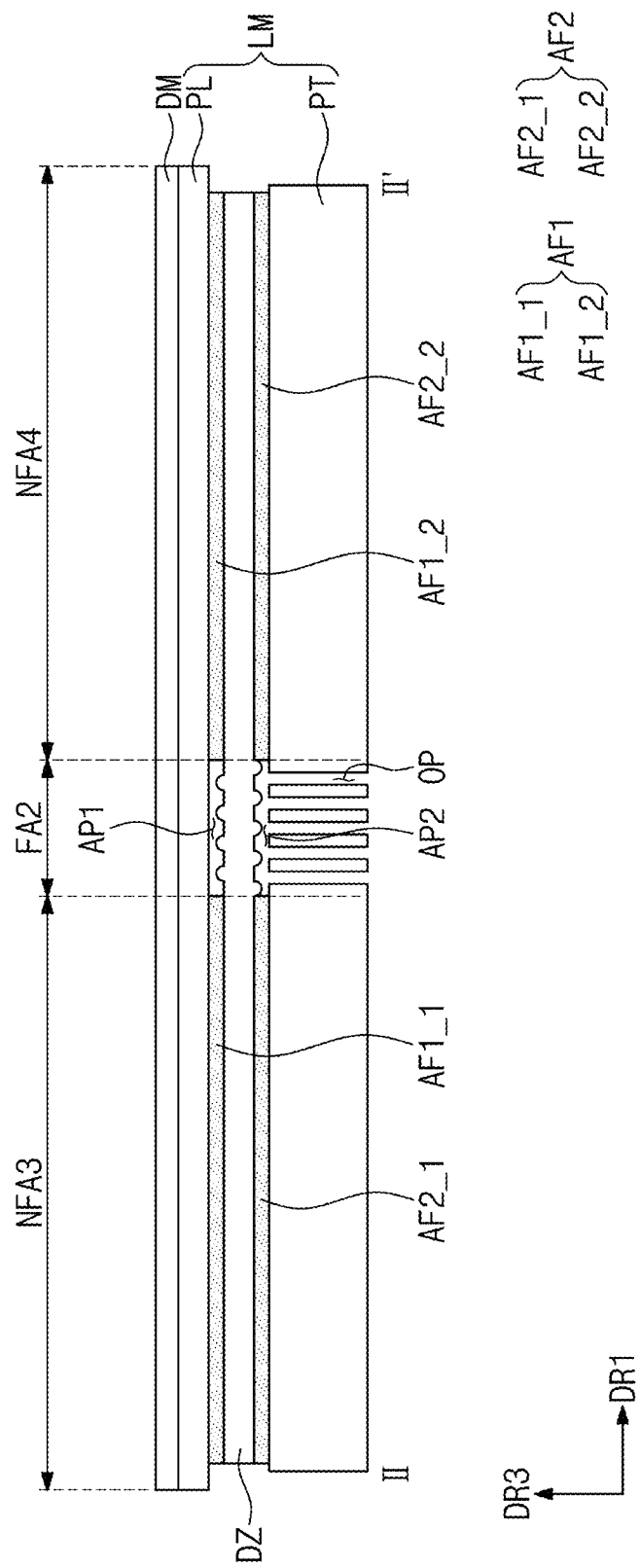
FIG. 6B is a cross-sectional view taken along line II-II' shown in FIG. 6A.

FIG. 6A is an exploded perspective view of an electronic apparatus according to another embodiment of the inventive concept, and FIG. 6B is a cross-sectional view taken along line II-II' shown in FIG. 6A.

Referring to FIGS. 6A and 6B, the lower module LM may further include a first adhesive layer AF1 and a second adhesive layer AF2. The first adhesive layer AF1 is disposed above the digitizer DZ, and the second adhesive layer AF2 is disposed below the digitizer DZ. The first adhesive layer AF1 includes a first sub-adhesive layer AF1_1 and a second sub-adhesive layer AF1_2. The first sub-adhesive layer AF1_1 and the second sub-adhesive layer AF1_2 may be disposed to be spaced apart from each other with respect to the folding area FA2. That is, the first sub-adhesive layer AF1_1 and the second sub-adhesive layer AF1_2 are spaced apart from each other in the first direction DR1 to define a first separation area SA1 therebetween. The first separation area SA1 (i.e., empty space) may be provided corresponding to the folding area FA2. The first sub-adhesive layer AF1_1 may be disposed corresponding to the first non-folding area NFA3, and the second sub-adhesive layer AF1_2 may be disposed corresponding to the second non-folding area NFA4.

The second adhesive layer AF2 includes a third sub-adhesive layer AF2_1 and a fourth sub-adhesive layer AF2_2. The third sub-adhesive layer AF2_1 and the fourth sub-adhesive layer AF2_2 may be disposed to be spaced apart from each other with respect to the folding area FA2. That is, the third sub-adhesive layer AF2_1 and the fourth sub-adhesive layer AF2_2 are spaced apart from each other in the first direction DR1 to define a second separation area SA2 therebetween. The second separation area SA2 (i.e., empty space) may be provided corresponding to the folding area FA2. The third sub-adhesive layer AF2_1 may be disposed corresponding to the first non-folding area NFA3, and the fourth sub-adhesive layer AF2_2 may be disposed corresponding to the second non-folding area NFA4.

The first and second adhesive layers AF1 and AF2 each may include an optically transparent adhesive material. As an example of the inventive concept, the first and second adhesive layers AF1 and AF2 each may include a pressure sensitive adhesive (PSA), an optically clear adhesive (OCA), or an optically clear resin (OCR).

The lower module LM further includes a protective layer PL disposed below the display module DM. The protective layer PL may be disposed between the digitizer DZ and the display module DM. As an example of the inventive concept, the protective layer PL is disposed between the first adhesive layer AF1 and the display module DM. That is, a first portion of the protective layer PL disposed in the first non-folding area NFA3 is bonded to the digitizer DZ through the first sub-adhesive layer AF1_1, and a second portion of the protective layer PL disposed in the second non-folding area NFA4 is bonded to the digitizer DZ through the second sub-adhesive layer AF1_2. The first and second sub-adhesive layers AF1_1 and AF1_2 are spaced apart from each other in the folding area FA2, and a first air gap AP1 is provided between the protective layer PL and the digitizer DZ as the first separation area SA1 between the first and second sub-adhesive layers AF1_1 and AF1_2.

The second adhesive layer AF2 is disposed between the digitizer DZ and the plate PT. A first portion of the plate PT disposed in the first non-folding area NFA3 is bonded to the digitizer DZ through the third sub-adhesive layer AF2_1, and a second portion of the plate PT disposed in the second non-folding area NFA4 is bonded to the digitizer DZ through the fourth sub-adhesive layer AF2_2. The third and fourth sub-adhesive layers AF2_1 and AF2_2 are spaced apart from each other in the folding area FA2, and a second air gap AP2 is provided between the plate PT and the digitizer DZ as the second separation area SA2 between the third and fourth sub-adhesive layers AF2_1 and AF2_2.

The digitizer DZ and the protective layer PL may be spaced apart from each other in the third direction DR3 through the first air gap AP1, and the digitizer DZ and the plate PT may be spaced apart from each other in the third direction DR3 through the second air gap AP2. Accordingly, it is effectively reduced or prevented for the surface steps st1 and st2 (see FIG. 5) formed on the digitizer DZ from being reflected in the display module DM and the upper module UM and therefore from being viewed on the first display surface FS of the electronic apparatus EA_1.

As an example of the inventive concept, the first and second adhesive layers AF1 and AF2 each may have a thickness of about 0.1 μm to 25 μm in the third direction DR3. In addition, the first and second adhesive layers AF1 and AF2 each may have a modulus of about 0.01 MPa to about 0.2 MPa at −20° C. However, the thickness and modulus of the first and second adhesive layers AF1 and AF2 according to the invention are not limited thereto.

Figure 7A:
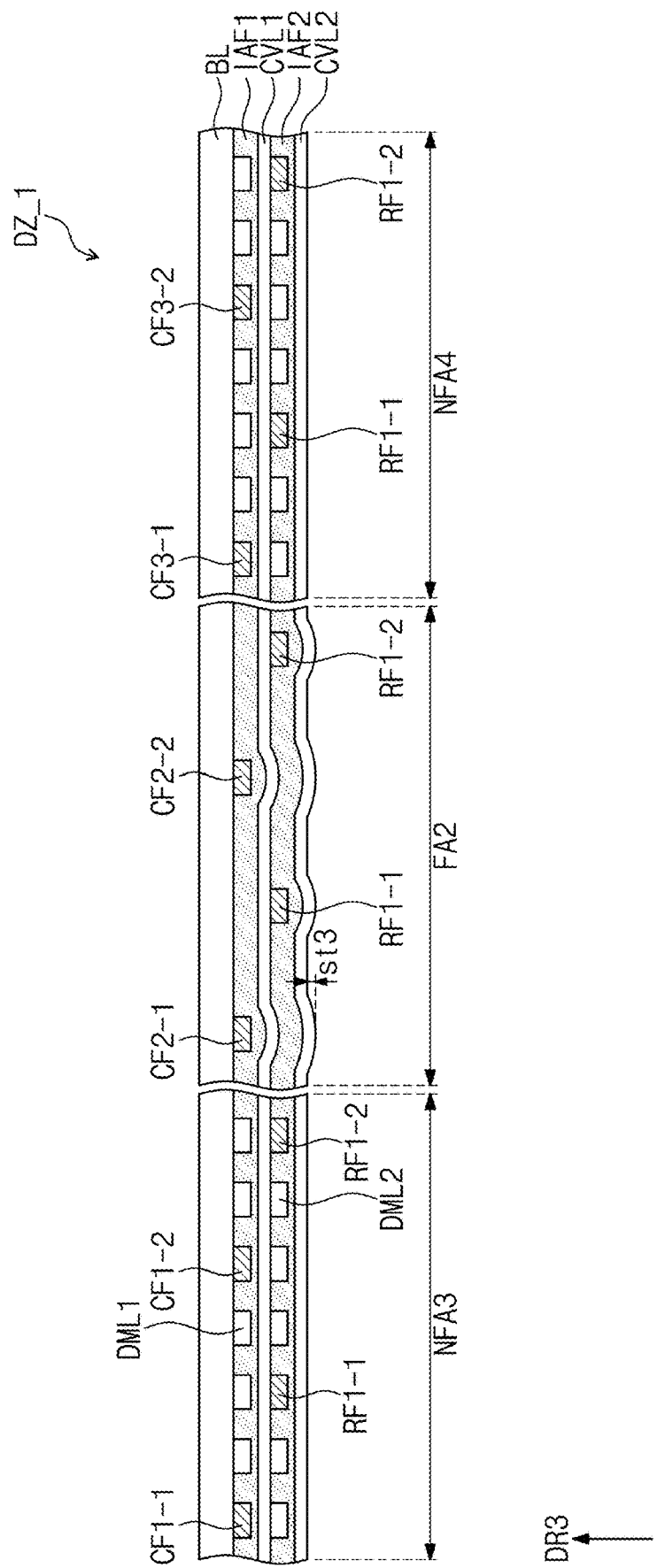
Figure 7C:
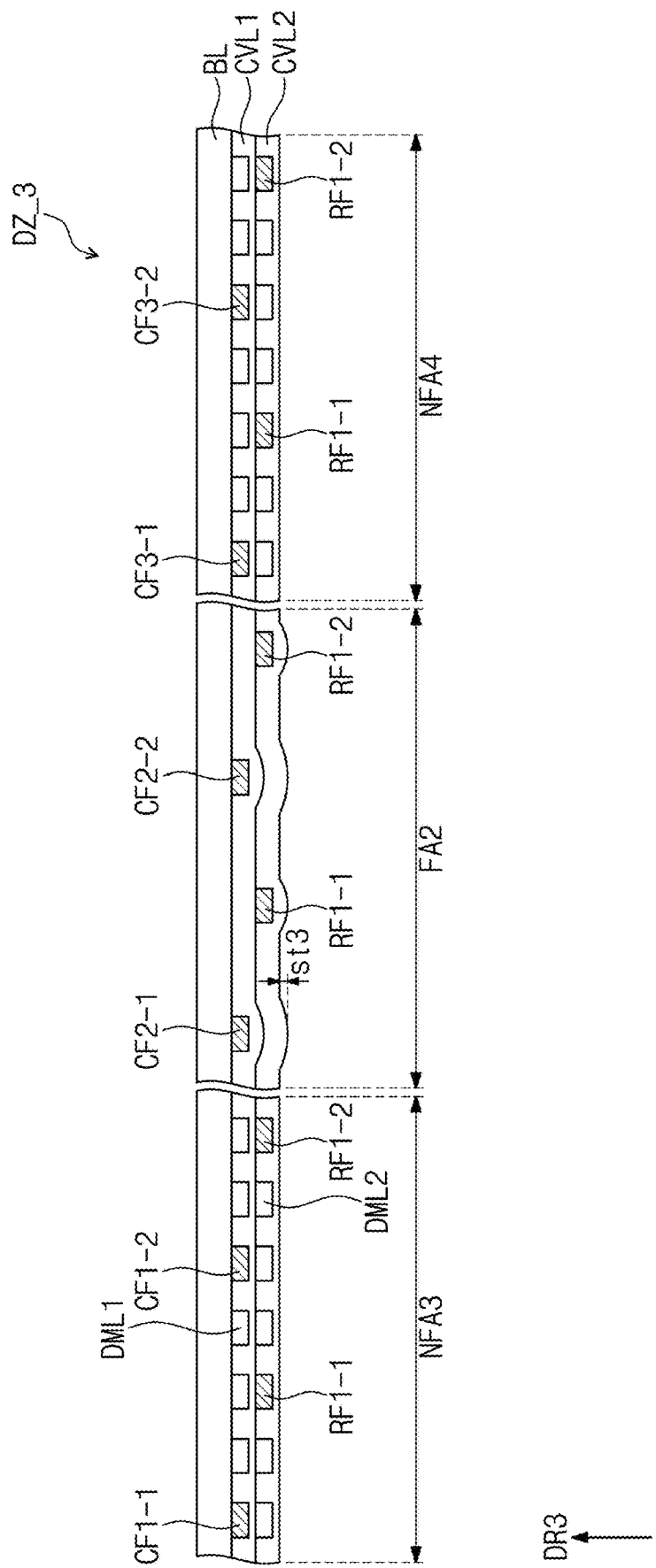

FIG. 7A to 7C are enlarged cross-sectional views of a digitizer according to other embodiments of the inventive concept.

Referring to FIG. 7A, the first sensing lines CF1-1 to CF3-3 are disposed on a second surface of the base layer BL. The second surface of the base layer BL may be defined as a lower surface of the base layer BL. The digitizer DZ_1 further includes a first cover layer CVL1 covering the first sensing lines CF1-1 to CF3-3. The second sensing lines RF1-1 to RF2-3 are disposed on the first cover layer CVL1. The digitizer DZ_1 may further include a second cover layer CVL2 covering the second sensing lines RF1-1 to RF2-3. The first and second cover layers CVL1 and CVL2 each may include the same material as the base layer BL. That is, the first and second cover layers CVL1 and CVL2 each may include polyimide (PI).

The digitizer DZ_1 further includes a first inner adhesive layer IAF1 and a second inner adhesive layer IAF2. The first inner adhesive layer IAF1 is disposed between the base layer BL and the first cover layer CVL1, and the second inner adhesive layer IAF2 is disposed between the first cover layer CVL1 and the second cover layer CVL2. Accordingly, the first cover layer CVL1 is bonded to the second surface of the base layer BL through the first inner adhesive layer IAF1, and the second cover layer CVL2 is bonded to the first cover layer CVL1 through the second inner adhesive layer IAF2.

As shown in FIG. 7A, when the first and second sensing lines CF1-1 to CF3-3 and RF1-1 to RF2-3 are disposed on the second surface of the base layer BL, and not disposed on the first surface of the base layer BL, a surface step may not be formed on an upper surface (i.e., first surface) of the digitizer DZ_1. That is, compared to a structure in which the first and second sensing lines CF1-1 to CF3-3 and RF1-1 to RF2-3 are disposed on both surfaces of the base layer BL as shown in FIG. 5, a structure in which the first and second sensing lines CF1-1 to CF3-3 and RF1-1 to RF2-3 are disposed on one surface of the base layer BL as shown in FIG. 7A may have a surface step formed only on one surface of the digitizer DZ_1. That is, the surface roughness of the upper surface of the digitizer DZ_1 may be smaller than the surface roughness of the lower surface of the digitizer DZ_1.

In the first and second non-folding areas NFA3 and NFA4, the first dummy lines DML1 are disposed between the first sensing lines CF1-1 to CF3-3, and in the first and second non-folding areas NFA3 and NFA4, the second dummy lines DML2 are disposed between the second sensing lines RF1-1 to RF2-3. The first dummy lines DML1 are disposed in a separation area between the first sensing lines CF1-1 to CF3-3. The first dummy lines DML1 are disposed on the second surface of the base layer BL through the same manufacturing process as the first sensing lines CF1-1 to CF3-3. The first dummy lines DML1 and the first sensing lines CF1-1 to CF3-3 are disposed on the same layer.

The second dummy lines DML2 are disposed in a separation area between the second sensing lines RF1-1 to RF2-3. The second dummy lines DML2 are formed on the first cover layer CVL1 through the same manufacturing process as the second sensing lines RF1-1 to RF2-3. The second dummy lines DML2 and the second sensing lines RF1-1 to RF2-3 are disposed on the same layer. The disposition of the first and second dummy lines DML1 and DML2 may reduce or remove a surface step of the lower surface of the digitizer DZ_1 due to the first and second sensing lines CF1-1 to CF3-3 and RF1-1 to RF2-3 in the first and second non-folding areas NFA3 and NFA4.

The first and second dummy lines DML1 and DML2 are not disposed in the folding area FA2. When the first and second dummy lines DML1 and DML2 are disposed in the folding area FA2, the flexibility of the folding area FA2 may be deteriorated due to the first and second dummy lines DML1 and DML2. That is, the first and second dummy lines DML1 and DML2 do not overlap the folding area FA2 in a plan view to prevent deterioration in the folding properties of the electronic apparatus EA (see FIG. 1A).

The first and second dummy lines DML1 and DML2 are not disposed in the folding area FA2, and a surface step st3 in the third direction DR3 due to the first and second sensing lines CF1-1 to CF3-3 and RF1-1 to RF2-3 may thus be formed on the lower surface of the digitizer DZ_1 in the folding area FA2. That is, due to the surface step st3, the surface roughness of the lower surface of the digitizer DZ_1 in the folding area FA2 may be greater than the surface roughness of the lower surface of the digitizer DZ_1 in the non-folding areas NFA3 and NFA4.

Referring to FIG. 7B, the digitizer DZ_2 may not include the second inner adhesive layer IAF2 shown in FIG. 7A. In this case, the second cover layer CVL2 may be disposed on the first cover layer CVL1 to directly cover the second sensing lines RF1-1 to RF2-3. The first and second cover layers CVL1 and CVL2 may include or be formed of the same material. As an example of the inventive concept, the first and second cover layers CVL1 and CVL2 each may include photocurable polyimide. The first and second cover layers CVL1 and CVL2 may be cured together, and in this case, it is difficult to view the boundary between the first and second cover layers CVL1 and CVL2 with the naked eye after the digitizer DZ_2 is completely manufactured.

Referring to FIG. 7C, the digitizer DZ_3 may not include the first and second inner adhesive layer IAF1 and IAF2 shown in FIG. 7A. In this case, the first cover layer CVL1 may be disposed on the base layer BL to directly cover the first sensing lines CF1-1 to CF3-3, and the second cover layer CVL2 may be disposed on the first cover layer CVL1 to directly cover the second sensing lines RF1-1 to RF2-3. The base layer BL, the first and second cover layers CVL1 and CVL2 may include or be formed of the same material. As an example of the inventive concept, the base layer BL, the first and second cover layers CVL1 and CVL2 each may include photocurable polyimide. The base layer BL, the first and second cover layers CVL1 and CVL2 may be cured together, and in this case, it is difficult to view the boundary between the base layer BL, the first and second cover layers CVL1 and CVL2 with the naked eye after the digitizer DZ_3 is completely manufactured.

In the digitizer having the structure of FIGS. 7B and 7C, the first and second dummy lines DML1 and DML2 are not disposed in the folding area FA2, and the surface step st3 due to the first and second sensing lines CF1-1 to CF3-3 and RF1-1 to RF2-3 may thus be formed on the lower surface of the digitizer corresponding to the folding area FA2.

A surface step is hardly caused on the upper surface of the digitizer shown in FIGS. 7A to 7C. In this case, the surface step of the upper surface of the digitizer may be about 2 μm or less.

Figure 8A:
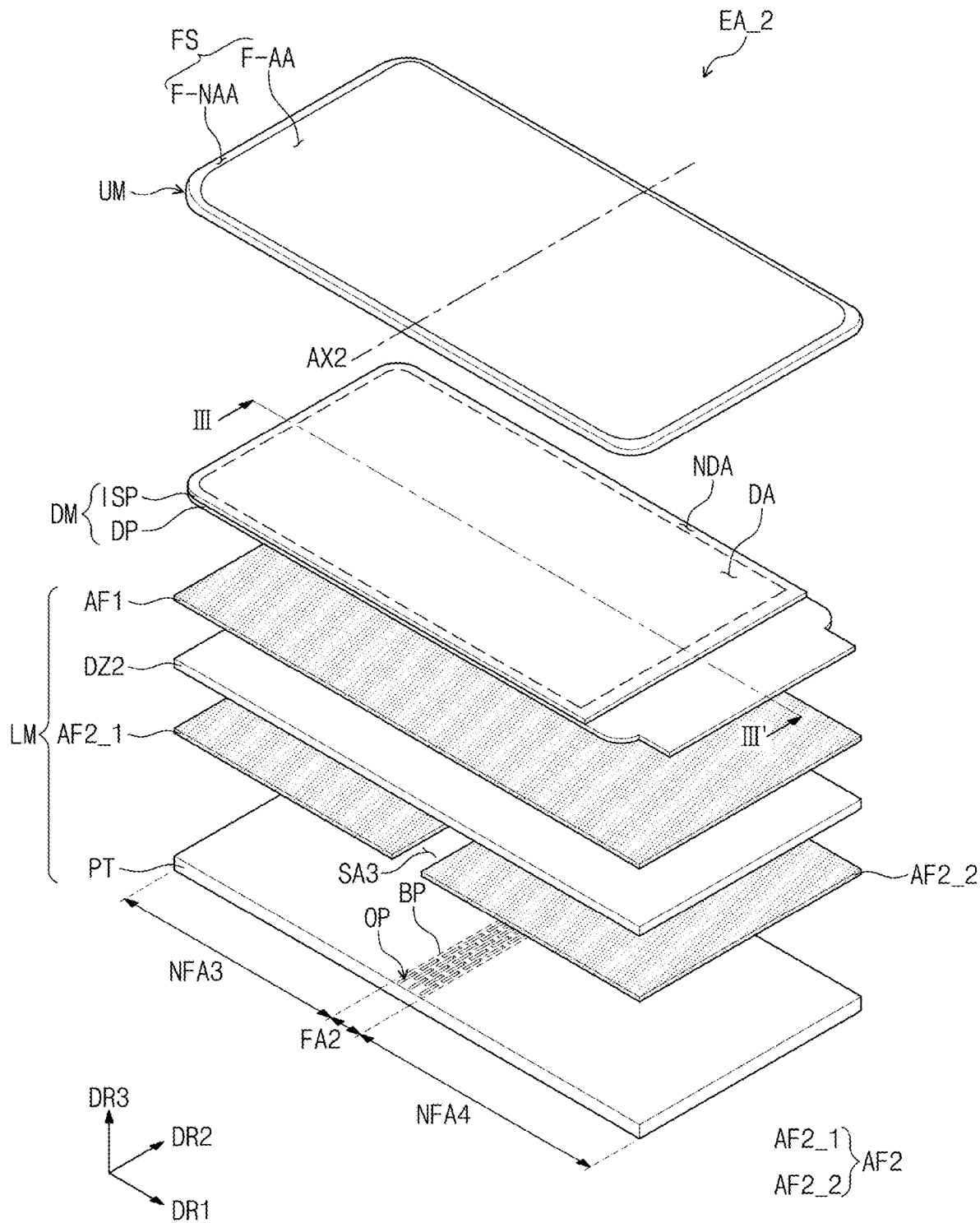
FIG. 8A is an exploded perspective view of an electronic apparatus according to an embodiment of the inventive concept.
Figure 8B:
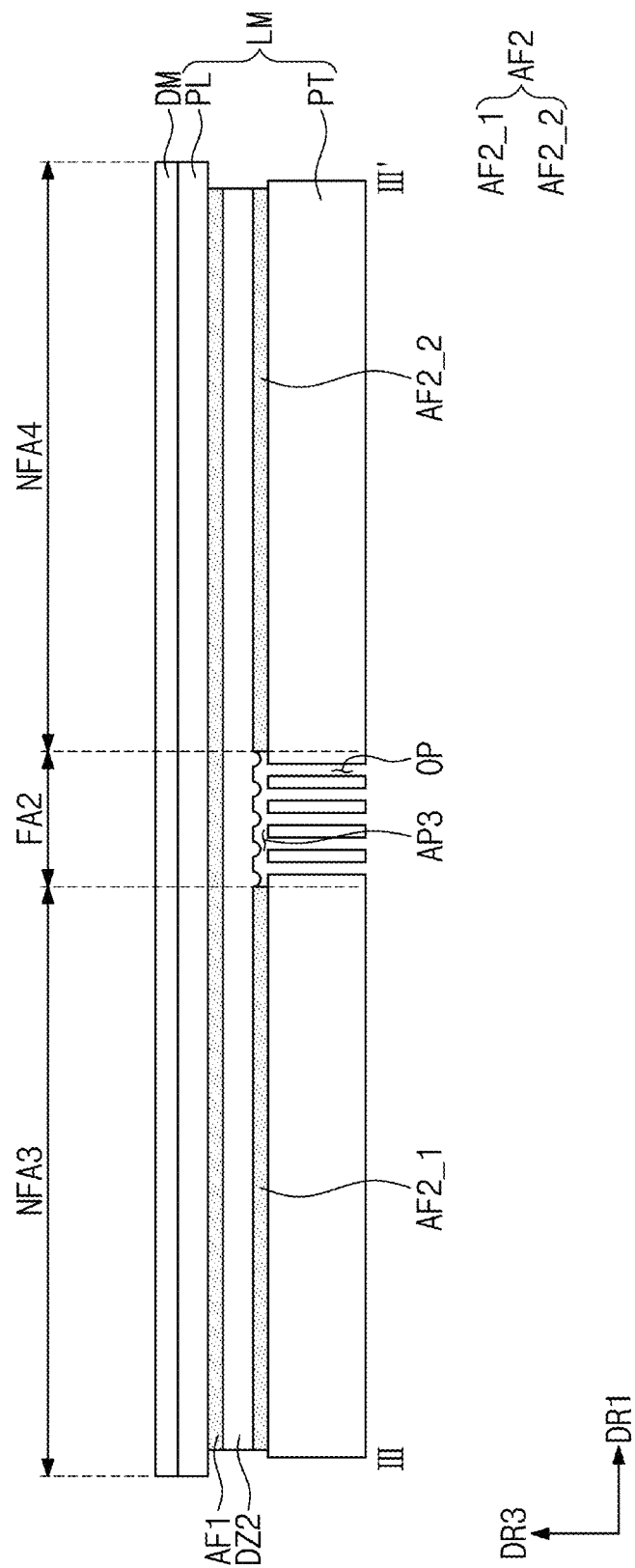
FIG. 8B is a cross-sectional view taken along line III-III" shown in FIG. 8A.

FIG. 8A is an exploded perspective view of an electronic apparatus according to an embodiment of the inventive concept, and FIG. 8B is a cross-sectional view taken along line shown in FIG. 8A.

Referring to FIGS. 8A and 8B, the lower module LM may further include a first adhesive layer AF1 and a second adhesive layer AF2. The first adhesive layer AF1 is disposed above the digitizer DZ2, and the second adhesive layer AF2 is disposed below the digitizer DZ2. In this case, the digitizer DZ2 may have the structure shown in FIGS. 7A to 7C.

The first adhesive layer AF1 has a size corresponding to the digitizer DZ, and may be provided to overlap the folding area FA2 and the first and second non-folding areas NFA3 and NFA4 in a plan view. The second adhesive layer AF2 includes a third sub-adhesive layer AF2_1 and a fourth sub-adhesive layer AF2_2. The third sub-adhesive layer AF2_1 and the fourth sub-adhesive layer AF2_2 may be disposed to be spaced apart from each other with respect to the folding area FA2. That is, the third sub-adhesive layer AF2_1 and the fourth sub-adhesive layer AF2_2 are spaced apart from each other in the first direction DR1 to provide a third separation area SA3 (i.e., empty space) therebetween. The third sub-adhesive layer AF2_1 may be disposed corresponding to the first non-folding area NFA3, and the fourth sub-adhesive layer AF2_2 may be disposed corresponding to the second non-folding area NFA4.

The first and second adhesive layers AF1 and AF2 each may include an optically transparent adhesive material. As an example of the inventive concept, the first and second adhesive layers AF1 and AF2 each may include a pressure sensitive adhesive (PSA), an optically clear adhesive (OCA), or an optically clear resin (OCR).

The lower module LM further includes a protective layer PL disposed below the display module DM. The protective layer PL may be disposed between the digitizer DZ2 and the display module DM. As an example of the inventive concept, the protective layer PL is disposed between the first adhesive layer AF1 and the display module DM. The protective layer PL is bonded to the upper surface of the digitizer DZ2 through the first adhesive layer AF1. The digitizer DZ2 having the structure shown in FIGS. 7A to 7C has almost no surface step on the upper surface thereof, and the first adhesive layer AF1 may thus not be separated into two sub-adhesive layers.

The second adhesive layer AF2 is disposed between the digitizer DZ2 and the plate PT. A first portion of the plate PT disposed in the first non-folding area NFA3 is bonded to the digitizer DZ2 through the third sub-adhesive layer AF2_1, and a second portion of the plate PT disposed in the second non-folding area NFA4 is bonded to the digitizer DZ2 through the fourth sub-adhesive layer AF2_2. The third and fourth sub-adhesive layers AF2_1 and AF2_2 are spaced apart from each other in the folding area FA2, and a third air gap AP3 is provided between the plate PT and the digitizer DZ2 as the third separation area SA3 between the third and fourth sub-adhesive layers AF2_1 and AF2_2.

The digitizer DZ2 and the plate PT may be spaced apart from each other in the third direction DR3 through the third air gap AP3. Accordingly, the surface step st3 (see FIG. 5) formed on the lower surface of the digitizer DZ2 is effectively reduced or prevented from being reflected in the display module DM and the upper module UM and therefore from being viewed on the first display surface FS of the electronic apparatus EA.

Figure 9A:
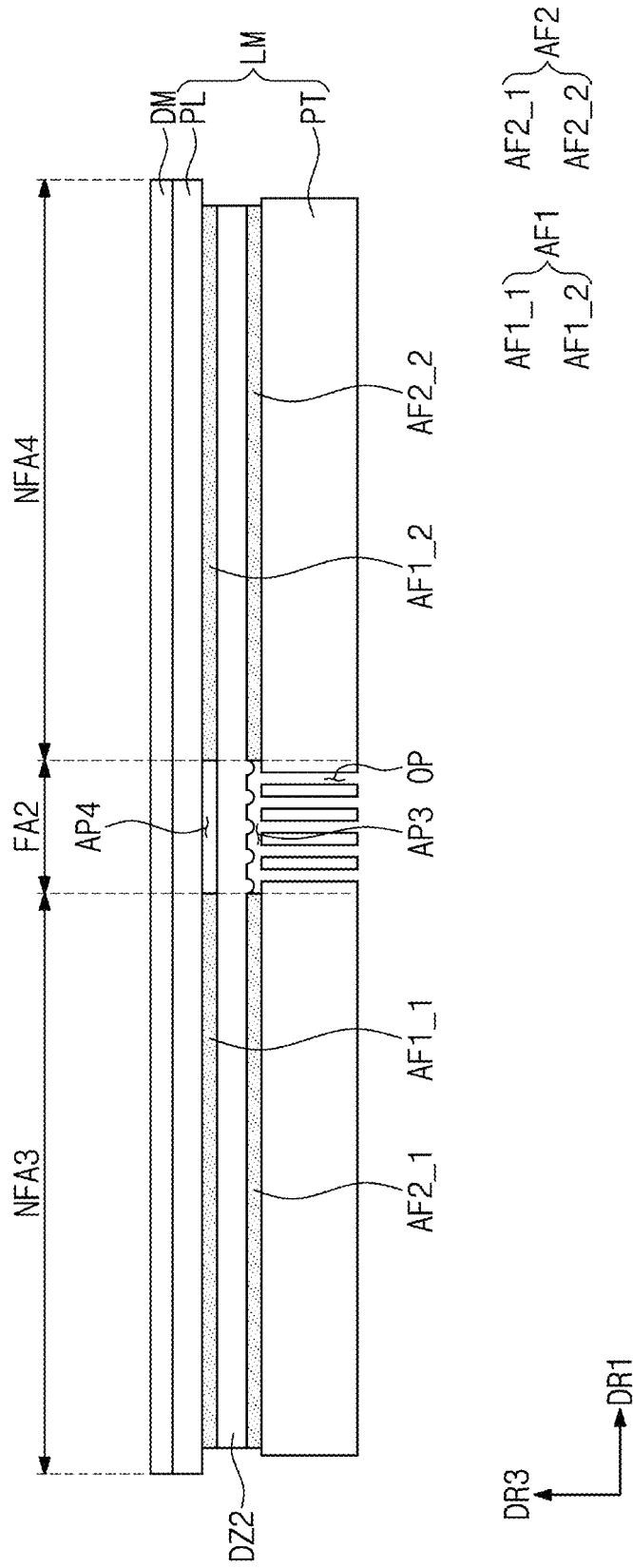
FIGS. 9A and 9B are cross-sectional views of a display module and a lower module according to an embodiment of the inventive concept.
Figure 9B:
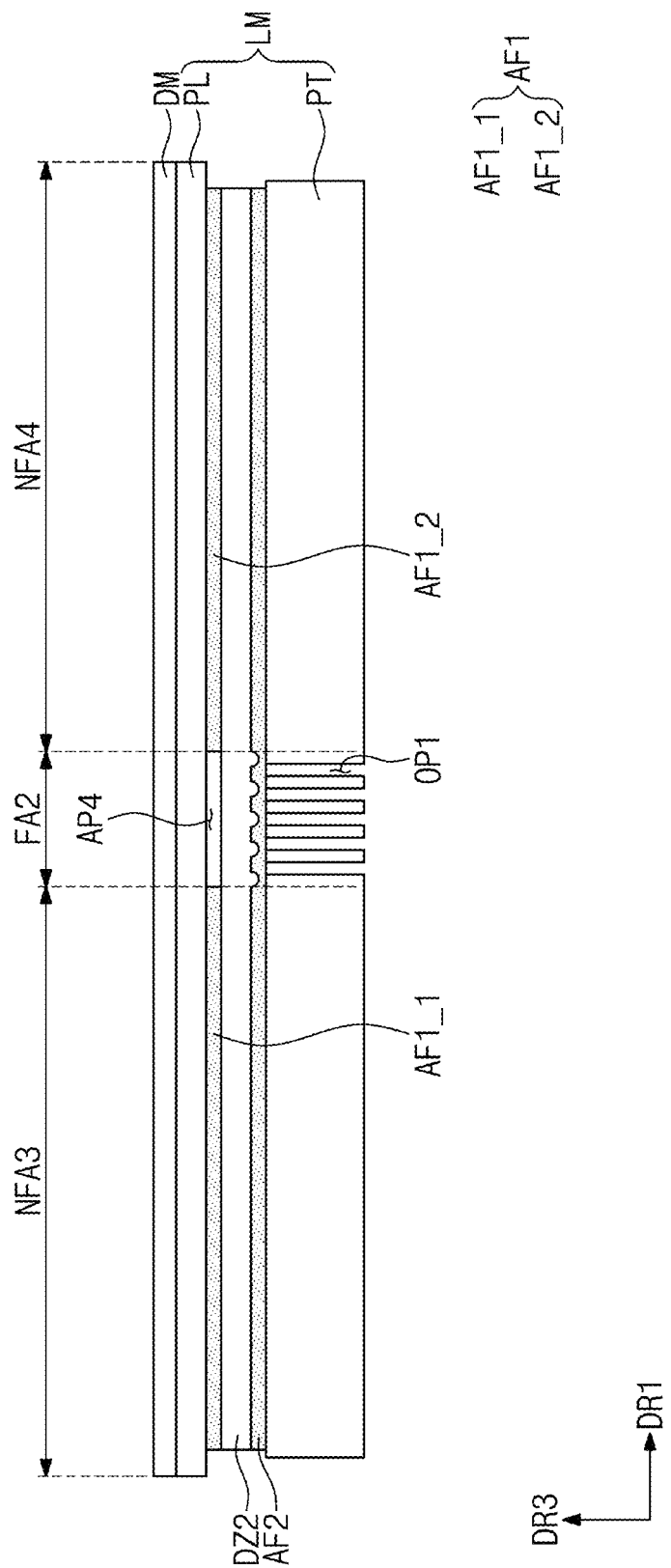

FIGS. 9A and 9B are cross-sectional views of a display module and a lower module according to an embodiment of the inventive concept.

Referring to FIG. 9A, the digitizer DZ2 may have the structure shown in FIGS. 7A to 7C. The first adhesive layer AF1 includes a first sub-adhesive layer AF1_1 and a second sub-adhesive layer AF1_2. The first sub-adhesive layer AF1_1 and the second sub-adhesive layer AF1_2 may be disposed to be spaced apart from each other with respect to the folding area FA2. The second adhesive layer AF2 includes a third sub-adhesive layer AF2_1 and a fourth sub-adhesive layer AF2_2. The third sub-adhesive layer AF2_1 and the fourth sub-adhesive layer AF2_2 may be disposed to be spaced apart from each other with respect to the folding area FA2.

A fourth air gap AP4 is provided between the protective layer PL and the digitizer DZ2 in the folding area FA2, and a third air gap AP3 is provided between the plate PT and the digitizer DZ2 in the folding area FA2.

The digitizer DZ2 and the protective layer PL may be spaced apart from each other in the third direction DR3 by the fourth air gap AP4, and the digitizer DZ2 and the plate PT may be spaced apart from each other in the third direction DR3 by the third air gap AP3. Accordingly, the surface step st3 (see FIG. 7A to 7C) formed on the lower surface of the digitizer DZ2 is effectively reduced or prevented from being reflected in the display module DM and the upper module UM and therefore from being viewed on the first display surface FS of the electronic apparatus EA.

Referring to FIG. 9B, the digitizer DZ2 may have the structure shown in FIGS. 7A to 7C. The first adhesive layer AF1 includes a first sub-adhesive layer AF1_1 and a second sub-adhesive layer AF1_2. The first sub-adhesive layer AF1_1 and the second sub-adhesive layer AF1_2 may be disposed to be spaced apart from each other with respect to the folding area FA2. The second adhesive layer AF2 may not be separated into two sub-adhesive layers.

The fourth air gap AP4 is provided between the protective layer PL and the digitizer DZ2 defined by the first and second sub-adhesive layers AF1_1 and AF1_2 spaced apart from each other in the folding area FA2. The digitizer DZ2 and the protective layer PL may be spaced apart from each other in the third direction DR3 by the fourth air gap AP4. Accordingly, the surface step st3 (see FIG. 7A to 7C) formed on the lower surface of the digitizer DZ2 is effectively reduced or prevented from being reflected in the display module DM and the upper module UM and therefore from being viewed on the first display surface FS of the electronic apparatus EA.

Figure 10B:
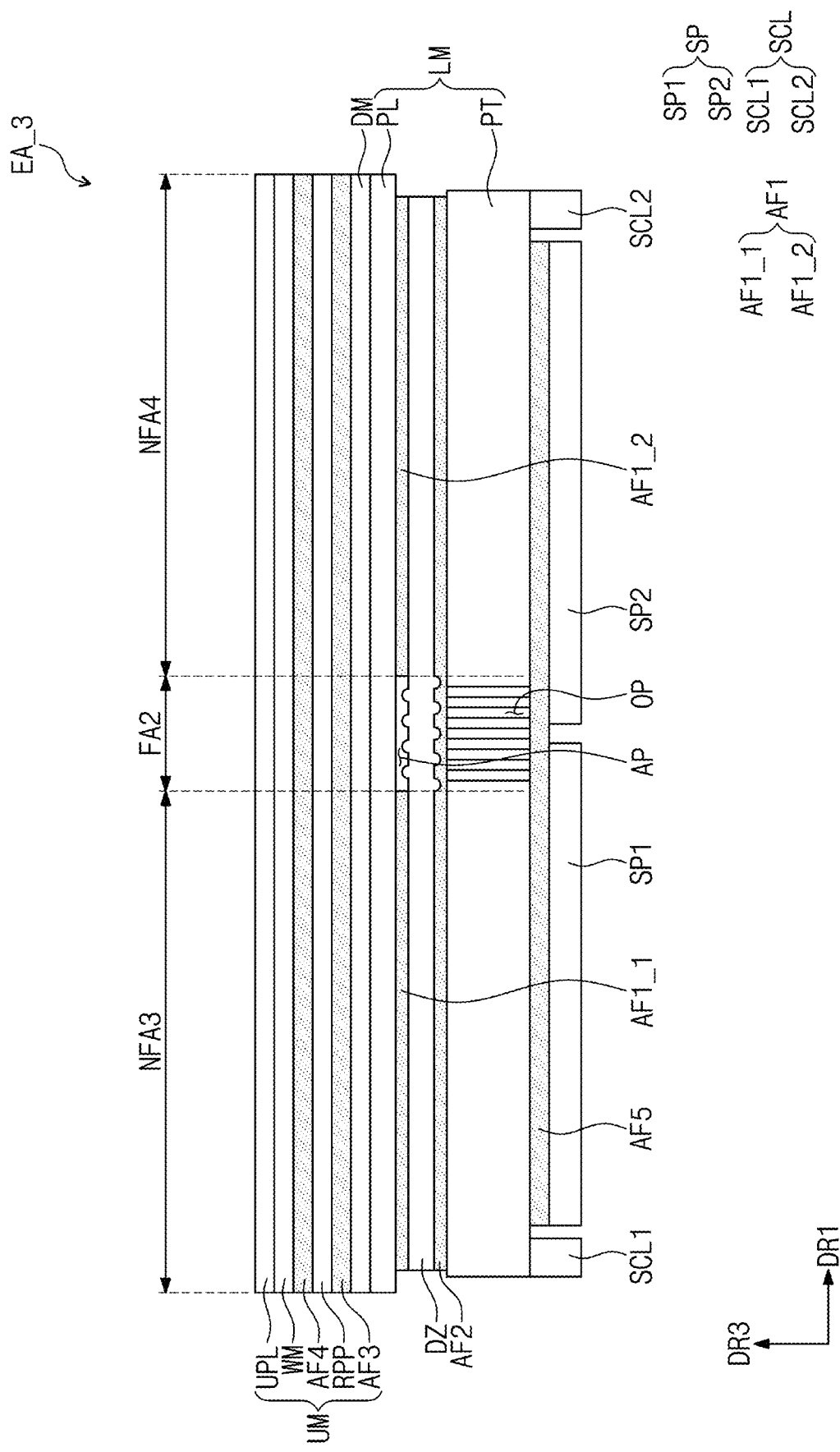

FIGS. 10A and 10B are cross-sectional views of an electronic apparatus according to an embodiment of the inventive concept.

Referring to FIG. 10A, in the electronic apparatus EA according to an embodiment of the inventive concept, the upper module UM may include a window WM. The window WM is disposed on the display module DM.

The window WM may include an optically transparent insulating material. Accordingly, images generated in the display module DM may be readily recognized by users through the window WM. For example, the window WM may include a glass substrate or a synthetic resin film. When the window WM is a thin-film glass, the thickness of the window WM may be about 0.1 μm to about 80 μm, and for example, may be about 30 μm, but the invention is not limited thereto. When the window WM is a synthetic resin film, the window WM may include a polyimide (PI) film or a polyethylene terephthalate (PET) film.

The window WM may have a multi-layer structure or a single-layer structure. For example, the window WM may include a plurality of synthetic resin films which are bonded through an adhesive, or may include a glass substrate and a synthetic resin film, which are bonded through an adhesive. The window WM may include or be formed of soft materials. Accordingly, the window WM may be folded or unfolded with respect to the folding axis AX2 (shown in FIG. 2A). That is, when the display module DM is modified in shape, the shape of the window WM may be modified together.

The window WM transmits images from the display module DM while reducing external impacts to prevent the display module DM from being damaged or malfunctioning due to the external impacts. The external impacts refer to a force that causes defects in the display module DM as external force such as pressure or stress.

An upper protective layer UPL is disposed on the window WM. The upper protective layer UPL may be a layer for improving impact resistance of the window WM and preventing scattering when damaged. The protective layer PL may include at least one selected from a urethane-based resin, an epoxy-based resin, a polyester-based resin, a polyether-based resin, an acrylate-based resin, an acrylonitrile-butadiene-styrene resin (ABS), and a rubber. As an example of the inventive concept, the protective layer may include at least one among phenylene, polyethylene terephthalate (PET), polyimide (PI), polyamide (PAI), polyethylene naphthalate (PEN), and polycarbonate (PC). The upper protective layer UPL may further include a hard coating material and an anti-fingerprint material.

At least one functional layer may be disposed between the display module DM and the window WM. As an example of the inventive concept, the functional layer may be an anti-reflection layer RPP capable of reducing the reflectance of external light incident from the outside. The anti-reflection layer RPP may prevent an issue in which elements forming the display module DM are viewed from the outside due to external light incident through a front surface of the electronic apparatus EA. The anti-reflection layer RPP may include a retarder and a polarizer. The retarder may be a film type or a liquid crystal coating type, and may include a λ/2 retarder and/or a λ/4 retarder. The polarizer may also be a film type or a liquid crystal coating type. The film type may include a stretchable synthetic resin film, and the liquid crystal coating type may include liquid crystals arranged in a predetermined arrangement. The stretchable synthetic resin film may be provided by dyeing an iodine compound to a polyvinyl alcohol film ("PVA" film). The retarder and the polarizer may be implemented as one polarizing film. The functional layer may further include a protective film disposed above or below the anti-reflection layer RPP.

The upper module UM may further include a third adhesive layer AF3 and a fourth adhesive layer AF4. The third adhesive layer AF3 is disposed between the window WM and the anti-reflection layer RPP, and the fourth adhesive layer AF4 is disposed between the anti-reflection layer RPP and the display module DM. The third and fourth adhesive layers AF3 and AF4 may be a transparent adhesive layer such as a pressure sensitive adhesive film, an optically clear adhesive film, or an optically clear adhesive resin. The fourth adhesive layer AF4 may be omitted, and in this case, the anti-reflection layer RPP may be directly disposed on the display module DM.

Referring to FIG. 10B, in an embodiment of the inventive concept, the lower module LM may further include a support plate SP and a step compensation film SCL. The support plate SP may be disposed below the plate PT to support the display module DM. The support plate SP may be a metal plate. The support plate SP may be a stainless steel plate. The support plate SP may include a material having an elastic modulus of about 60 gigapascals (GPa) at room temperature. For example, the support plate SP may be SUS304, but the invention is not limited thereto. The heat dissipation performance of the electronic apparatus EA_3 may be improved through the support plate SP.

The support plate SP may include the number of support plates SP1 and SP2 corresponding to the non-folding areas NFA3 and NFA4. As an example of the inventive concept, the support plate SP may include a first support plate SP1 and a second support plate SP2 spaced apart from the first support plate SP1. The first and second support plates SP1 and SP2 may be disposed corresponding to the non-folding areas NFA3 and NFA4, respectively. That is, the first support plate SP1 is disposed corresponding to the third non-folding area NFA3 of the display module DM, and the second support plate SP2 is disposed corresponding to the fourth non-folding area NFA4 of the display module DM. When the display module DM is folded with respect to the folding axis AX2 (shown in FIG. 2A), the first and second support plates SP1 and SP2 may be spaced apart from each other in the third direction DR3.

The first and second support plates SP1 and SP2 may be spaced apart in the folding area FA2. The first and second support plates SP1 and SP2 may partially overlap the folding area FA2 in a plan view. That is, the separation distance between the first support plate SP1 and the second support plate SP2 in the first direction DR1 may be smaller than the width of the folding area FA2 in the first direction DR1.

The support plate SP may further include a connection module for connecting the first and second support plates SP1 and SP2. The connection module may include a hinge module or a multi joint module.

The case that the support plate SP is provided with two support plates SP1 and SP2 is presented, but the embodiment of the inventive concept is not limited thereto. That is, when the number of the folding axis AX2 increases, the support plate SP may include a plurality of support plates separated with respect to the folding axis AX2.

The support plate SP may be bonded to the plate PT through a fifth adhesive layer AF5. In FIG. 10B, the fifth adhesive layer AF5 is provided to overlap the folding area FA2 and the non-folding areas NFA3 and NFA4 in a plan view. However, the embodiment of the inventive concept is not limited thereto. That is, in another embodiment, the fifth adhesive layer AF5 may be provided to overlap the non-folding areas NFA3 and NFA4 but not to overlap the folding area FA2 in a plan view. In addition, as another example, the fifth adhesive layer AF5 may include a non-adhesive portion formed due to the loss of adhesive force in the folding area FA2.

The step compensation film SCL may be disposed below the plate PT. The step compensation film SCL may be provided in an area non-overlapping the support plate SP in a plan view. Accordingly, the step compensation film SCL may compensate for a step between an area in which the support plate SP is disposed and an area in which the support plate SP is not disposed from the plate PT.

The step compensation film SCL may include at least one adhesive layer. The step compensation film SCL may be fixed to the rear surface of the plate PT through the adhesive layer.

The step compensation film SCL may include a first step compensation film SCL1 disposed adjacent to the first support plate SP1 and a second step compensation film SCL2 disposed adjacent to the second support plate SP2. The first and second step compensation films SCL1 and SCL2 may be spaced apart from the folding area FA2 and the support plates SP1 and SP2.

According to an embodiment of the inventive concept, in an electronic apparatus including a digitizer, in order to prevent a surface step formed on the digitizer from being reflected in an upper module, an adhesive layer disposed adjacent to the digitizer is removed corresponding to a folding area, thereby providing air gaps.

Accordingly, even when the surface step is formed due to sensing lines of the digitizer in the folding area, the surface step is not transmitted to the upper module, and as a result, an issue that the surface step of the digitizer is viewed may be prevented. Accordingly, the inventive concept may provide an electronic apparatus having improved product reliability.

As described above, embodiments of the inventive concept have been disclosed in the drawings and the specification. Although specific terms have been used in the present specification, these are merely intended to describe the inventive concept and are not intended to limit the meanings thereof or the scope of the inventive concept described in the accompanying claims. Therefore, those skilled in the art will appreciate that various modifications and other equivalent embodiments are possible from the embodiments. Therefore, the technical scope of the inventive concept should be defined by the technical spirit of the claims.

What is claimed is:

1. An electronic apparatus comprising:
a display module in which a folding area is defined;
a plate disposed below the display module to support the display module;
a digitizer disposed between the plate and the display module;
a first adhesive layer disposed between the display module and the digitizer; and
a second adhesive layer disposed between the digitizer and the plate,
wherein at least one of the first adhesive layer and the second adhesive layer includes first and second sub-adhesive layers spaced apart from each other with respect to the folding area, and a separation area between the first and second sub-adhesive layers provides an air gap overlapping the folding area in a plan view.

2. The electronic apparatus of claim 1, wherein the digitizer comprises:

a base layer;

a plurality of first sensing lines disposed on a first surface of the base layer; and a plurality of second sensing lines disposed on a second surface of the base layer, wherein the second surface is opposite the first surface with respect to the base layer.

3. The electronic apparatus of claim 2, wherein the digitizer further comprises:

a first dummy line disposed between the plurality of first sensing lines; and a second dummy line disposed between the plurality of second sensing lines, wherein the first and second dummy lines do not overlap the folding area in the plan view.

4. The electronic apparatus of claim 3, wherein:

the first adhesive layer comprises the first and second sub-adhesive layers;

the separation area includes a first separation area between the first and second sub-adhesive layers of the first adhesive layer; and the air gap includes a first air gap provided between the display module and the digitizer by the first separation area.

5. The electronic apparatus of claim 4, wherein:

the second adhesive layer comprises third and fourth sub-adhesive layers spaced apart from each other;

a second separation space between the third and fourth sub-adhesive layers overlaps the folding area in the plan view; and a second air gap is provided between the digitizer and the plate by the second separation space between the third and fourth sub-adhesive layers.

6. The electronic apparatus of claim 1, wherein the digitizer comprises:

a base layer;

a plurality of first sensing lines disposed on the base layer;

a first cover layer covering the plurality of first sensing lines;

a plurality of second sensing lines disposed on the first cover layer; and a second cover layer covering the plurality of second sensing lines.

7. The electronic apparatus of claim 6, wherein the digitizer further comprises a first inner adhesive layer disposed between the first cover layer and the base layer.

8. The electronic apparatus of claim 7, wherein the digitizer further comprises a second inner adhesive layer disposed between the second cover layer and the first cover layer.

9. The electronic apparatus of claim 6, wherein the first and second cover layers comprise photocurable polyimide.

10. The electronic apparatus of claim 6, wherein the base layer and the first and second cover layers each comprise photocurable polyimide.

11. The electronic apparatus of claim 6, wherein:

the second adhesive layer comprises the first and second sub-adhesive layers;

the separation area includes a first separation area between the first and second sub-adhesive layers of the second adhesive layer; and the air gap includes a third air gap provided between the digitizer and the plate by the first separation area.

12. The electronic apparatus of claim 11, wherein:

the first adhesive layer comprises third and fourth sub-adhesive layers spaced apart from each other;

a second separation area between the third and fourth sub-adhesive layers overlaps the folding area in the plan view; and a fourth air gap is provided between the display module and the digitizer by the second separation space between the third and fourth sub-adhesive layers.

13. The electronic apparatus of claim 1, wherein the plate comprises a bending portion provided with a plurality of opening patterns overlapping the folding area in the plan view.

14. The electronic apparatus of claim 1, further comprising a protective layer disposed between the display module and the first adhesive layer.

15. The electronic apparatus of claim 1, wherein the first and second adhesive layers each have an elastic modulus of about 0.01 megapascals (MPa) to about 0.2 MPa at about −20 degrees in Celsius (° C.).

16. The electronic apparatus of claim 1, wherein the first and second adhesive layers each have a thickness of about 0.1 micrometer (μm) to about 25 μm.

17. An electronic apparatus comprising:

a display module having a first non-folding area, a second non-folding area, and a folding area defined therein, and having a first state where the display module is flat and a second state where the display module is folded such that the first and second non-folding areas face each other;

a window disposed on the display module;

a plate disposed below the display module and including a bending portion overlapping the folding area in a plan view;

a digitizer disposed between the plate and the display module;

a first adhesive layer disposed between the display module and the digitizer; and a second adhesive layer disposed between the digitizer and the plate, wherein at least one of the first adhesive layer and the second adhesive layer includes first and second sub-adhesive layers spaced apart from each other with respect to the folding area, and a separation area between the first and second sub-adhesive layers provides an air gap overlapping the folding area in the plan view.

18. The electronic apparatus of claim 17, wherein the digitizer comprises:

a plurality of first sensing lines;

a plurality of second sensing lines insulatively crossing the plurality of first sensing lines;

a first dummy line disposed between the plurality of first sensing lines; and a second dummy line disposed between the plurality of second sensing lines.

19. The electronic apparatus of claim 18, wherein the first and second dummy lines do not overlap the folding area in the plan view.

20. The electronic apparatus of claim 17, wherein the window comprises a thin film glass having a thickness of about 0.1 μm to about 80 μm.

\* \* \* \* \*